(12) United States Patent
Kim

(10) Patent No.: US 11,902,225 B2
(45) Date of Patent: Feb. 13, 2024

(54) METHOD FOR ENTERING GROUP EVENT THROUGH INSTANT MESSAGING APPLICATION

(71) Applicant: LINE Plus Corporation, Seongnam-si (KR)

(72) Inventor: Keum Ryong Kim, Seongnam-si (KR)

(73) Assignee: LINE Plus Corporation, Gyeonggi-do (KR)

( * ) Notice: Subject to any disclaimer, the term of this patent is extended or adjusted under 35 U.S.C. 154(b) by 0 days.

(21) Appl. No.: 17/123,611

(22) Filed: Dec. 16, 2020

(65) Prior Publication Data
US 2021/0194835 A1 Jun. 24, 2021

(30) Foreign Application Priority Data
Dec. 18, 2019 (KR) ................ 10-2019-0170142

(51) Int. Cl.
| H04L 29/06 | (2006.01) |
| H04L 12/58 | (2006.01) |
| G06F 15/16 | (2006.01) |
| H04W 4/16 | (2009.01) |
| G06Q 50/00 | (2012.01) |
| H04L 51/04 | (2022.01) |
| H04L 65/403 | (2022.01) |

(52) U.S. Cl.
CPC ............ *H04L 51/04* (2013.01); *H04L 65/403* (2013.01)

(58) Field of Classification Search
CPC .............................. H04L 51/04; H04L 65/403
USPC ........................................................ 709/206
See application file for complete search history.

(56) References Cited

U.S. PATENT DOCUMENTS

| 6,016,478 A * | 1/2000 | Zhang ................ G06Q 10/1095 709/202 |
| 8,599,801 B2 * | 12/2013 | Baio ..................... H04L 12/185 370/312 |
| 9,047,382 B2 * | 6/2015 | Baldwin ............... H04L 67/306 |
| 10,484,347 B2 * | 11/2019 | Kim ...................... H04L 9/0891 |
| 10,587,553 B1 * | 3/2020 | Ghafourifar .......... H04L 65/403 |
| 10,972,301 B2 * | 4/2021 | Roedel ................ H04L 12/1859 |
| 2006/0053196 A1 * | 3/2006 | Spataro ................. H04L 65/403 709/205 |

(Continued)

FOREIGN PATENT DOCUMENTS

| JP | 2007-193794 A | 8/2007 |
| KR | 10-0650677 B1 | 11/2006 |

(Continued)

*Primary Examiner* — Hua Fan
*Assistant Examiner* — Golam Mahmud
(74) *Attorney, Agent, or Firm* — Harness, Dickey & Pierce, P.L.C.

(57) ABSTRACT

An operation method of a user terminal for participating in a group event through an instant messaging application includes receiving, by the user terminal, a group event invitation message including information about an event start time through the instant messaging application; receiving, by the user terminal, a response to the invitation message from a user of the user terminal; in response to the user accepting the invitation message, transmitting, by the user terminal, an acceptance message through the instant messaging application; and receiving, by the user terminal, a group event participation request through the instant messaging application at a time corresponding to the event start time.

17 Claims, 15 Drawing Sheets

(56) References Cited

U.S. PATENT DOCUMENTS

| | | |
|---|---|---|
| 2007/0168447 A1 | 7/2007 | Chen et al. |
| 2007/0283403 A1 | 12/2007 | Eklund et al. |
| 2009/0157513 A1* | 6/2009 | Bonev ................ G06Q 30/0273 |
| | | 707/999.005 |
| 2010/0022225 A1* | 1/2010 | Benger ................... H04L 67/62 |
| | | 455/414.1 |
| 2013/0246633 A1* | 9/2013 | Giesen ............... H04L 65/1066 |
| | | 709/227 |
| 2013/0263020 A1* | 10/2013 | Heiferman ......... H04L 12/1818 |
| | | 715/753 |
| 2013/0336310 A1* | 12/2013 | Laasik ............... H04L 65/1069 |
| | | 370/352 |
| 2014/0068467 A1 | 3/2014 | Van et al. |
| 2014/0118467 A1 | 5/2014 | Kim et al. |
| 2014/0358632 A1* | 12/2014 | Graff ...................... H04L 63/08 |
| | | 705/7.29 |
| 2015/0256570 A1* | 9/2015 | Joon ................... H04L 65/1069 |
| | | 370/261 |
| 2015/0358582 A1* | 12/2015 | Zhou ..................... H04L 65/403 |
| | | 348/14.07 |
| 2016/0014059 A1* | 1/2016 | Rathod ............. H04M 1/72484 |
| | | 715/752 |
| 2016/0098687 A1* | 4/2016 | Lamons ............. G06Q 10/1095 |
| | | 705/7.19 |
| 2017/0104704 A1* | 4/2017 | Choi ..................... H04L 51/046 |
| 2018/0077542 A1* | 3/2018 | Xie ......................... H04W 4/12 |
| 2018/0165652 A1* | 6/2018 | Bastide ............. G06Q 10/1093 |
| 2018/0300782 A1* | 10/2018 | Hwang .................. G06Q 20/12 |
| 2020/0351265 A1* | 11/2020 | Srinath .................. H04N 7/152 |

FOREIGN PATENT DOCUMENTS

| | | |
|---|---|---|
| KR | 10-2014-0055252 A | 5/2014 |
| KR | 10-2014-0131300 A | 11/2014 |
| KR | 10-2018-0113069 A | 10/2018 |

* cited by examiner

FIG. 4
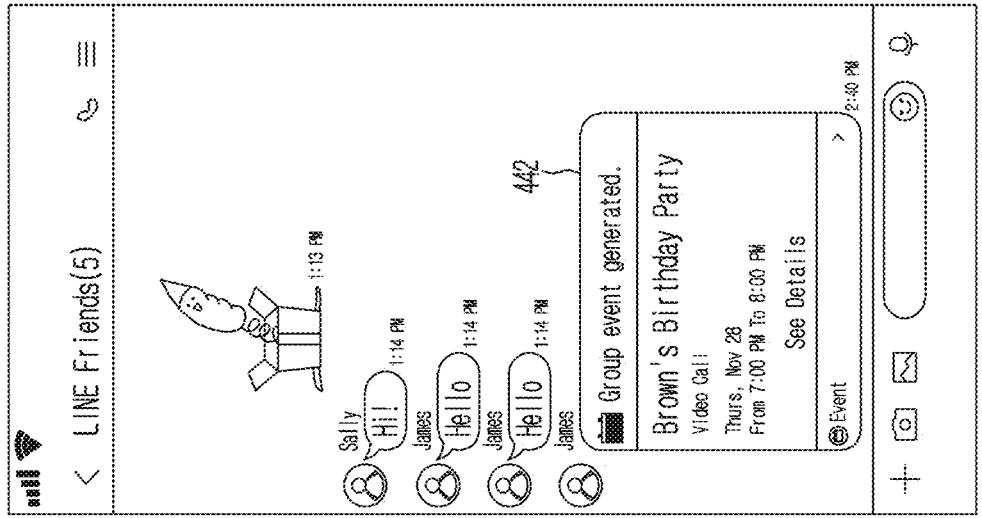
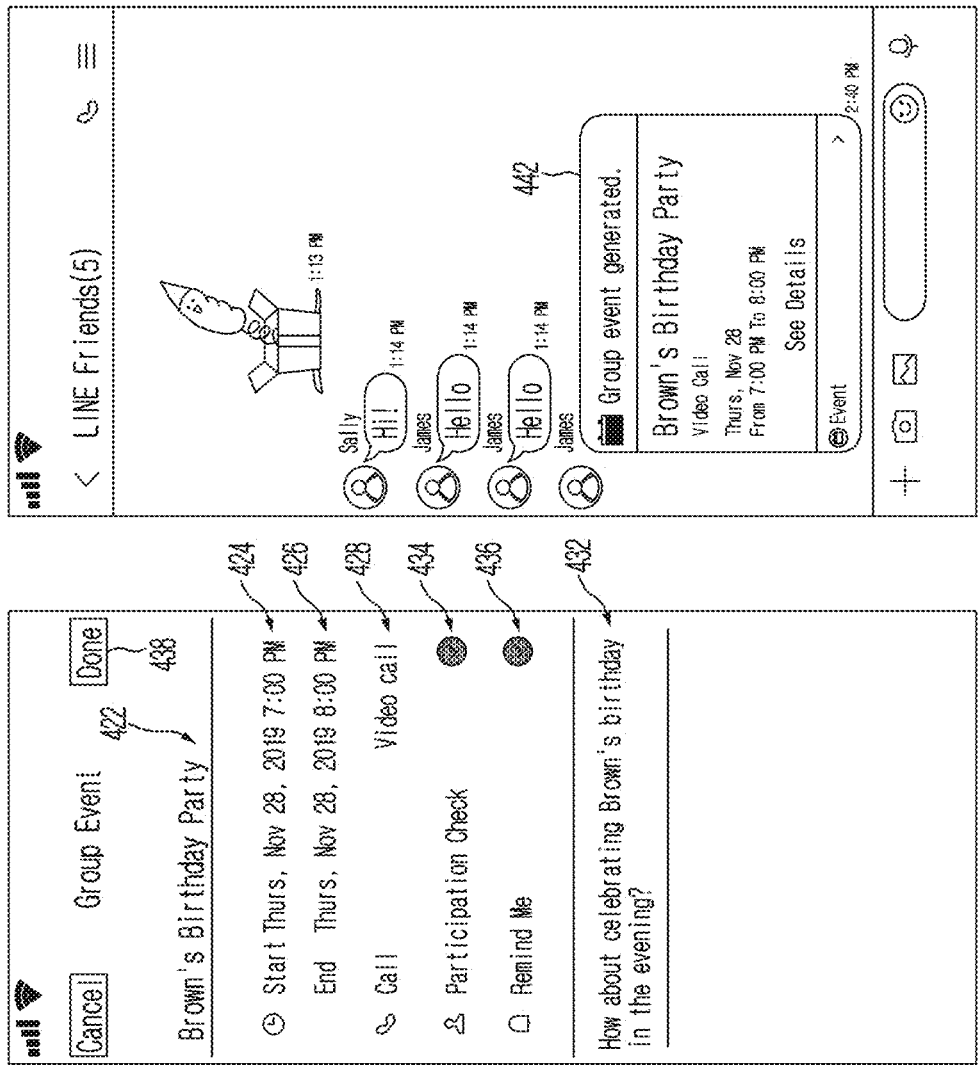
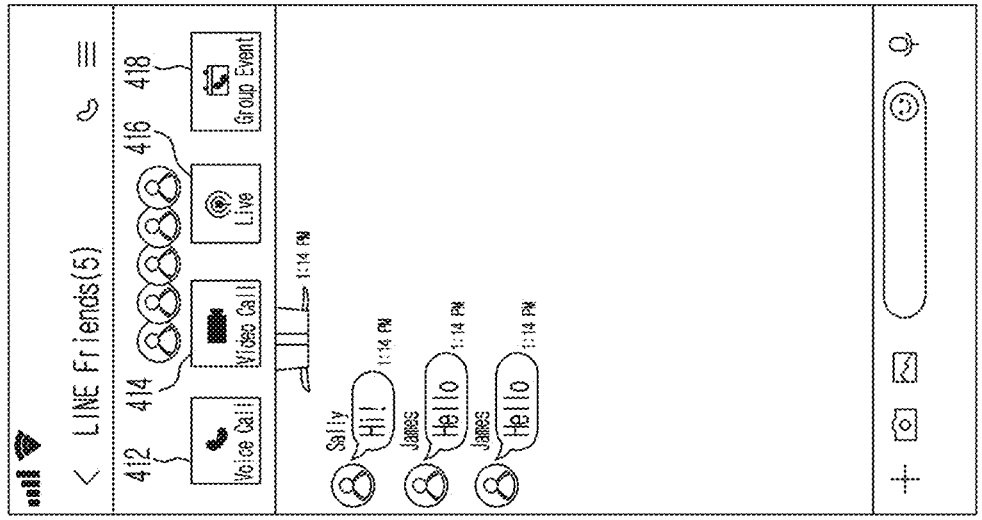

FIG. 5
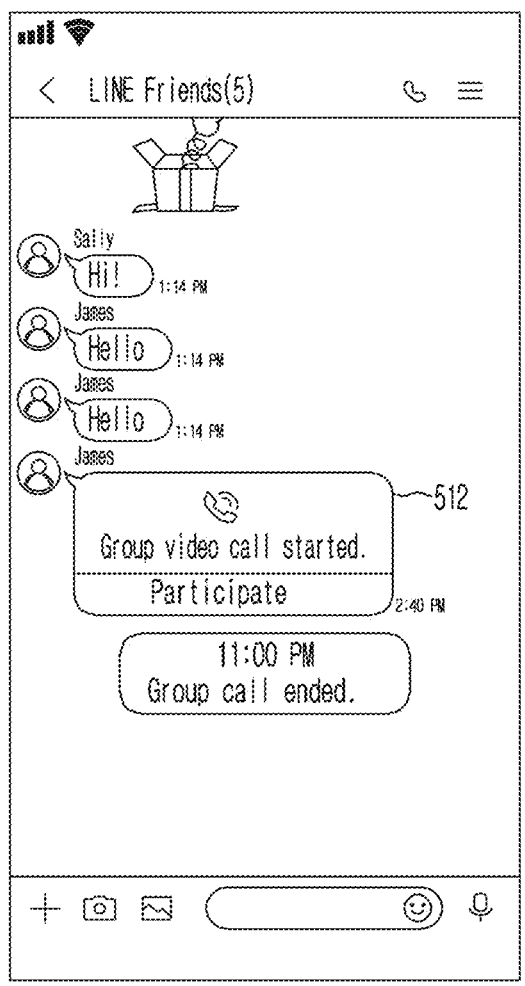
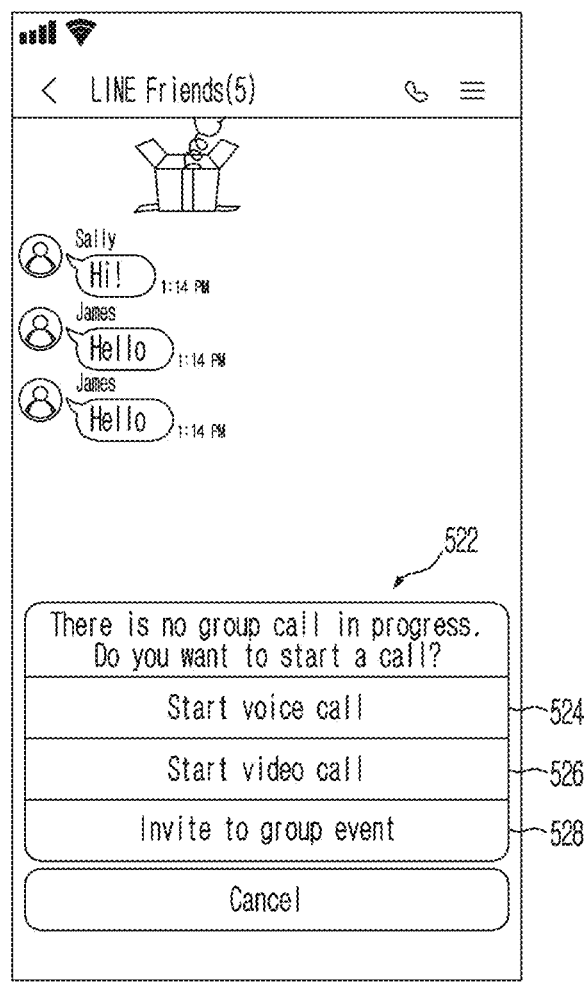

FIG. 6
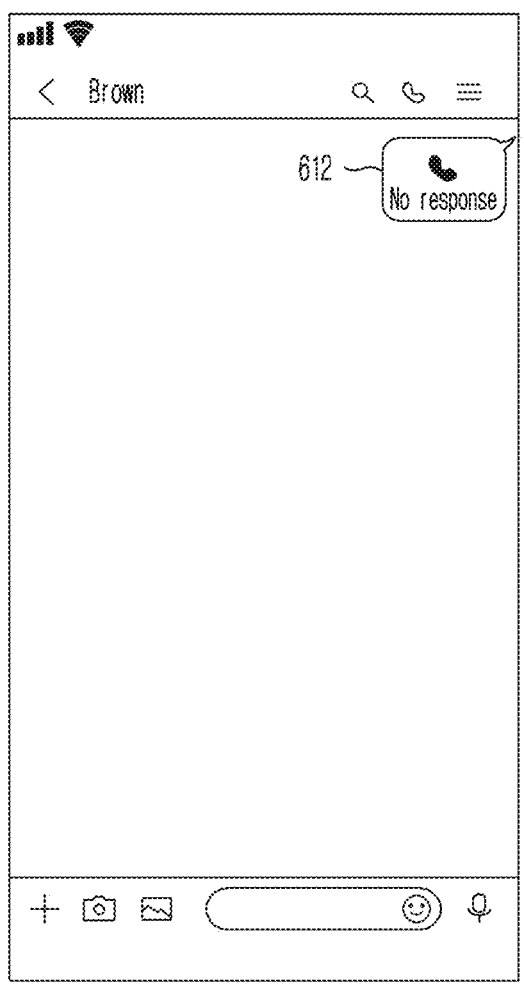
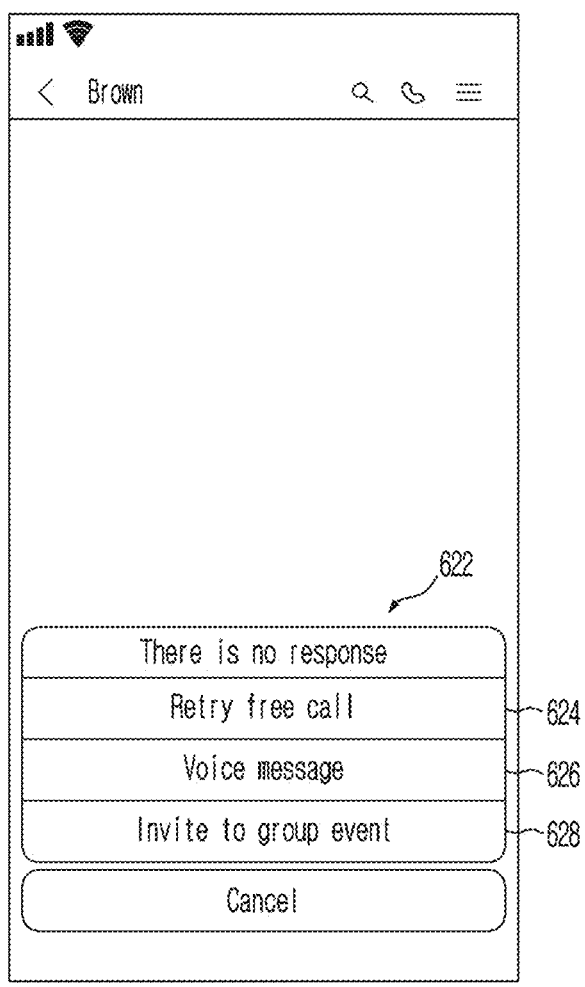

FIG. 10

FIG. 12
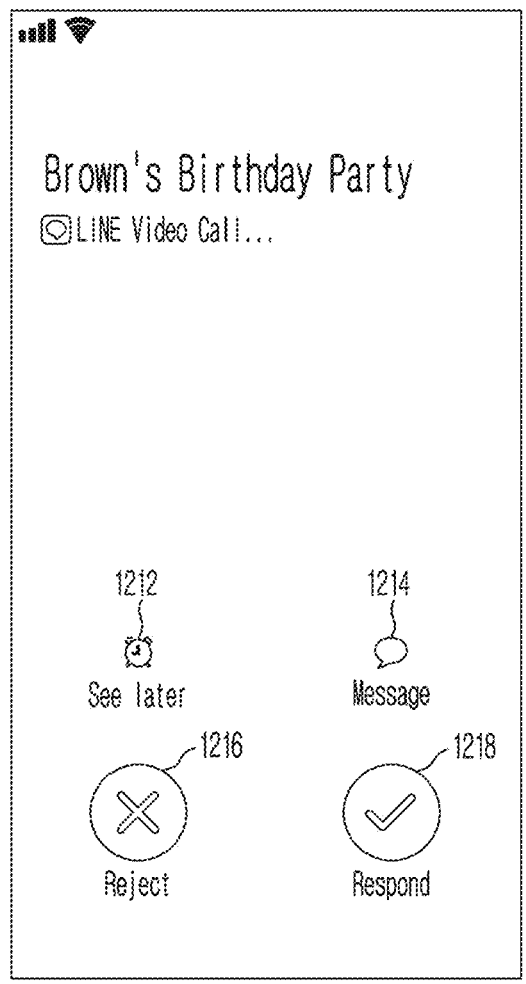
1210
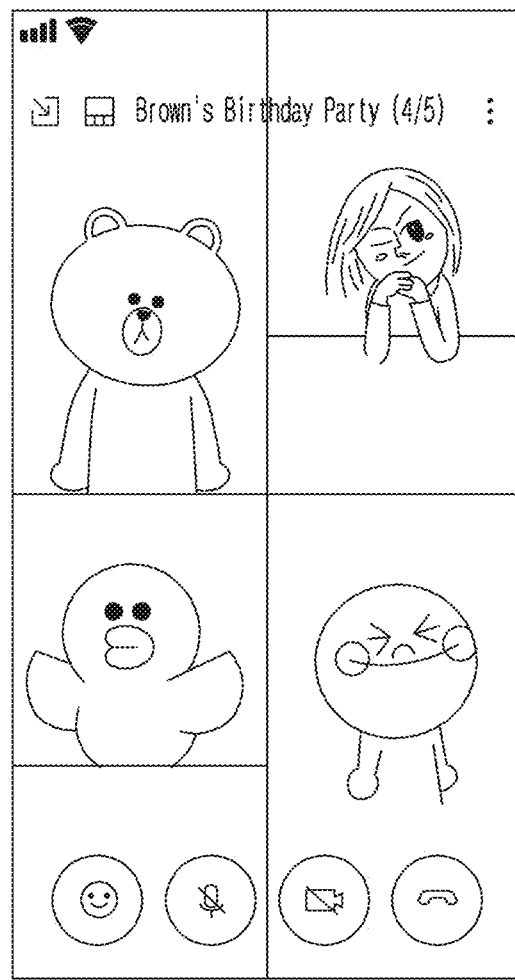
1220

FIG. 13
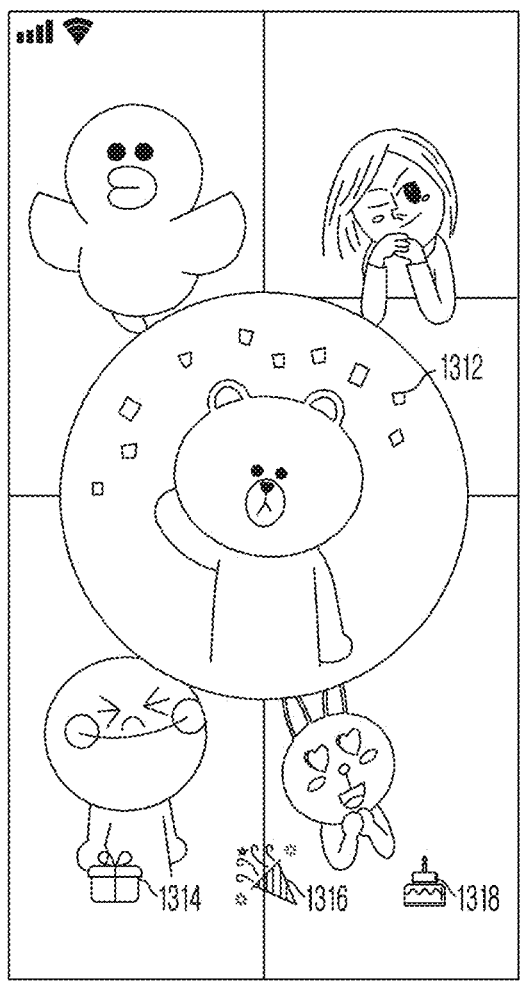
1310
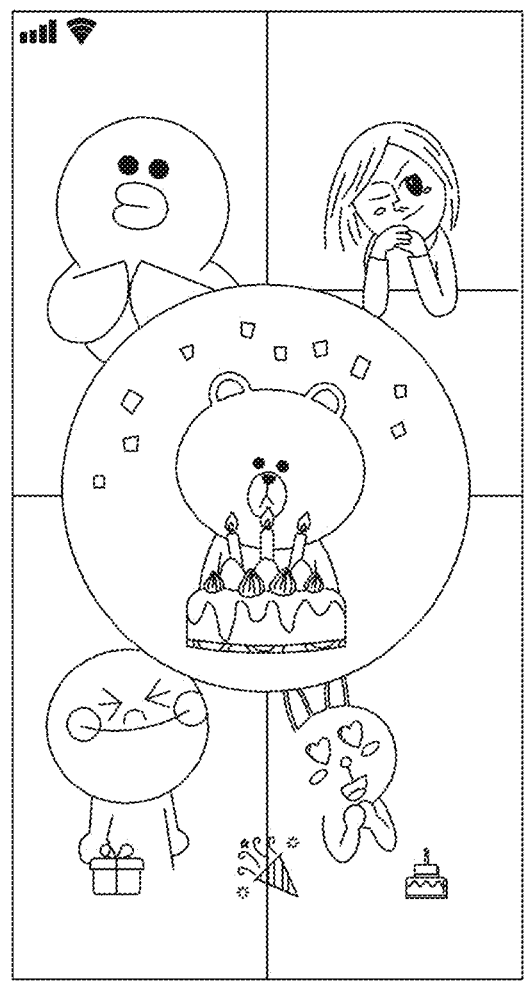
1320

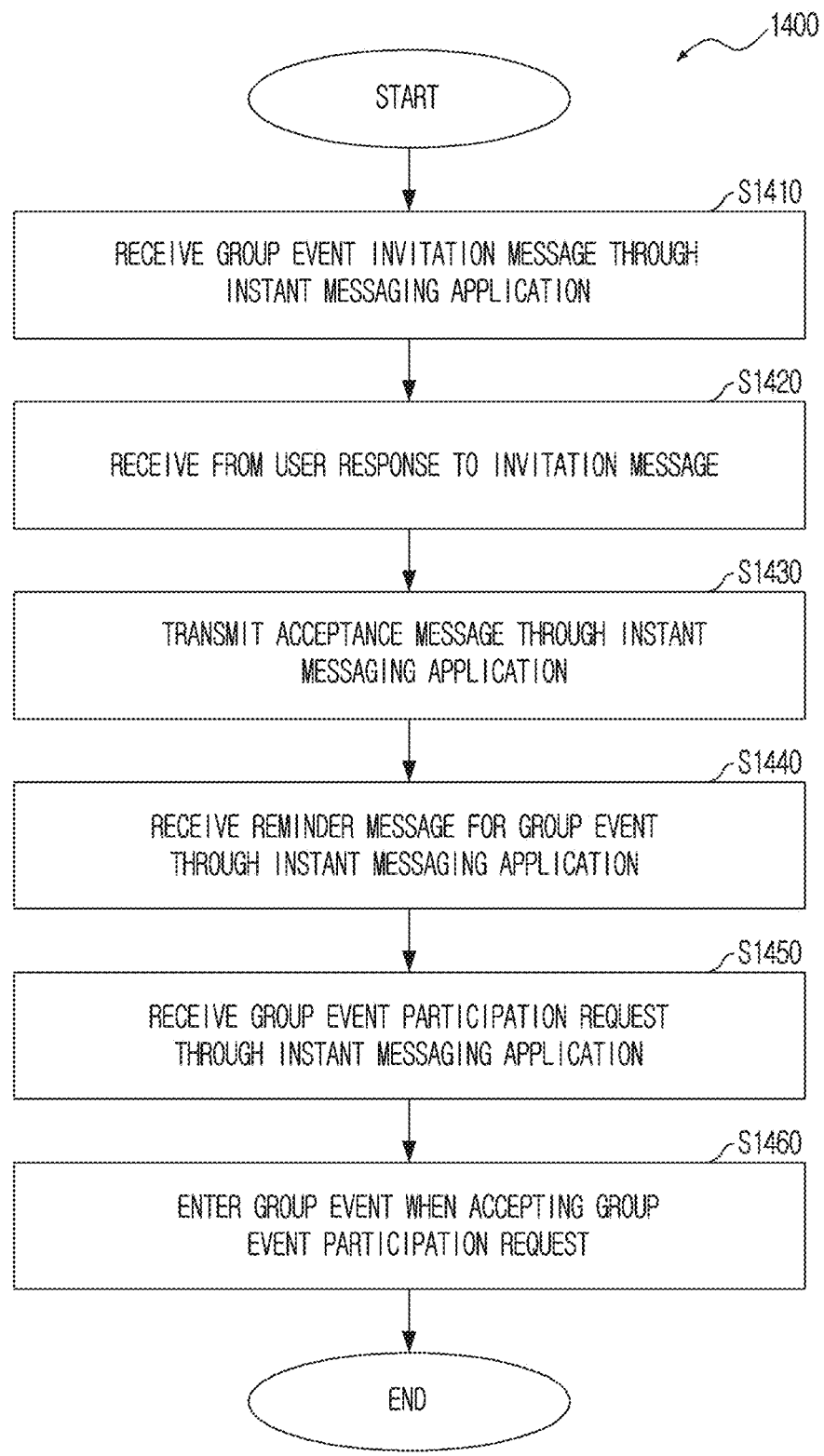

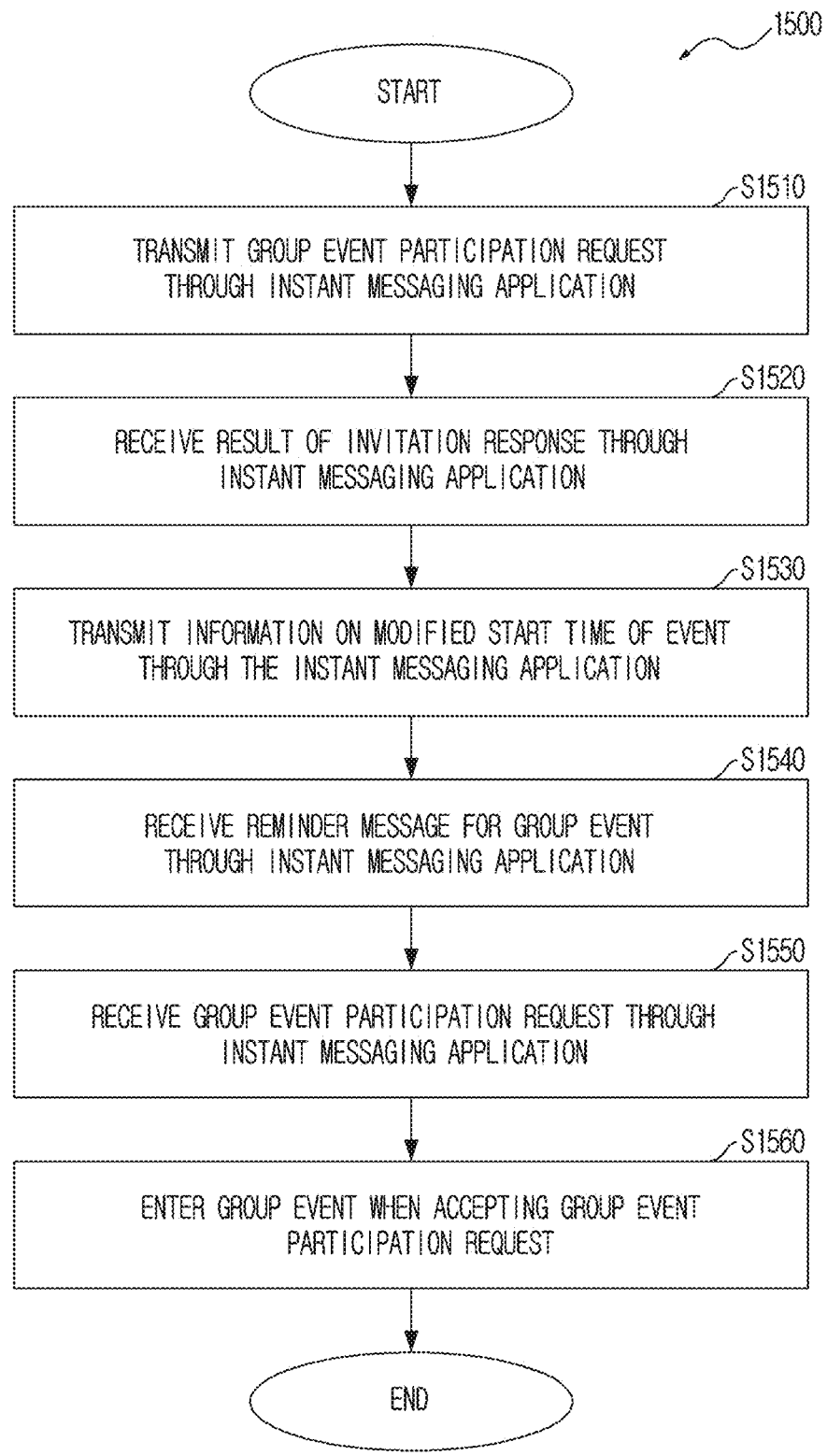

METHOD FOR ENTERING GROUP EVENT THROUGH INSTANT MESSAGING APPLICATION

CROSS-REFERENCE TO RELATED APPLICATION

This application claims priority under 35 U.S.C. § 119 to Korean Patent Application No. 10-2019-0170142, filed in the Korean Intellectual Property Office on Dec. 18, 2019, the entire contents of which are hereby incorporated by reference.

BACKGROUND

1. Field

The present disclosure relates, generally, to a method for participating in a group event and a method for generating a group event, and more specifically, to a method for participating in a group event and a method for generating a group event, capable of providing a push notification for a group event at a designated time by using a group event generation request received through an instant messaging application.

2. Related Art

Terminals such as smartphones, tablet PCs, laptop computers, desktop computers, and the like equipped with cameras and microphones are widely distributed. In addition, with recent developments in communication technology, users are able to easily transmit images, videos or voices captured or recorded with their own terminals to other people. Furthermore, as the users can transmit or broadcast captured images and recorded voices with their own terminals to other people in real time, services such as voice call services, video call services, and personal broadcasting services are widely used.

Meanwhile, these services are provided through various messengers, and users are able to make a call or start broadcasting immediately. However, there is a problem in that users are not able to easily confirm in advance if the other party intends to participate or to adjust the schedule in advance. In particular, in the case of a call or broadcast in which a large number of people participate, it is not easy for the user to select the time when everyone can participate and make a call or start broadcasting. In this case, there is a problem in that time is wasted unnecessarily because the user has to wait for all people to participate or try to call or broadcast again at a different time.

SUMMARY

In order to address one or more of the problems described above, the present disclosure provides a method for participating in a group event, a method for generating a group event, and a non-transitory computer-readable recording medium storing instructions.

A method for participating in a group event and a method for generating a group event are provided, which are capable of receiving a group event generation request through an instant messaging application and providing a push notification to a plurality of user terminals using an event start time included in the received group event generation request.

The present disclosure may be implemented in various ways, including a method, or non-transitory computer-readable storage medium storing instructions.

According to at least some example embodiments, an operation method of a user terminal for participating in a group event through an instant messaging application includes receiving, by the user terminal, a group event invitation message including information about an event start time through the instant messaging application; receiving, by the user terminal, a response to the invitation message from a user of the user terminal; in response to the user accepting the invitation message, transmitting, by the user terminal, an acceptance message through the instant messaging application; and receiving, by the user terminal, a group event participation request through the instant messaging application at a time corresponding to the event start time.

The method may further include entering the group event in response to receiving, by the user terminal, an acceptance of the group event participation request from the user.

The method may further include in response to receiving, by the user terminal, a request from the user to postpone the group event participation request, receiving the group event participation request again, by the user terminal, through the instant messaging application after a first period of time elapses.

The group event invitation message may further include information about at least one user account invited to the group event, and the method may further include displaying the information about the at least one user account; and displaying an invitation response result from the at least one user account.

The method may further include registering a schedule for the group event in a calendar application based on the information about the event start time.

The method may further include receiving a reminder message for the group event through the instant messaging application a first period of time before the event start time.

The method may further include receiving at least one of captured data or recorded data of the group event through the instant messaging application.

The invitation message may further include information about a host of the group event, and the method may further include displaying a plurality of video call screens on a display of the user terminal based on the information about the host.

The displaying the plurality of video call screens on the display of the user terminal based on the information about the host may include displaying a video call screen of the host in a center of the display; and displaying video call screens of other participants of the group event excluding the host on a periphery of the display.

The displaying the plurality of video call screens on the display of the user terminal based on the information about the host may include displaying a video call screen of the host and the video call screens of the other participants such that video call screen of the host is larger, on the display of the user terminal, than the video call screens of each of the other participants.

The invitation message may further include information about an event type, and the method may further include applying at least one of a visual effect or a sound effect to the group event based on the information about the event type.

The invitation message may further include information about an event type, and the method may further include providing an additional function within the group event based on the information about the event type.

The method may further include receiving a modified group event invitation message including information about a modified event start time through the instant messaging application.

A non-transitory computer-readable recording medium may store instructions that, when executed by at least one processor, cause the at least one processor to perform the method.

According to at least some example embodiments, an operation method of a user terminal for generating a group event through an instant messaging application includes receiving, by the user terminal, information about an invited user account and information about an event start time from a user; transmitting, by the user terminal, a group event generation request including the information about the invited user account and the information about the event start time through the instant messaging application; and receiving, by the user terminal, a group event participation request through the instant messaging application at a time corresponding to the event start time.

The method may further include receiving an invitation response result from the invited user account through the instant messaging application; receiving, by the user terminal, information about a modified event start time from the user; and transmitting the information about the modified event start time through the instant messaging application.

The method my further include entering into the group event in response to receiving, at the user terminal, an acceptance of the participation request from the user.

The group event generation request may further include information about a host of the group event, and the method may further include displaying a plurality of video call screens on a display of the user terminal based on the information about the host.

The displaying the plurality of video call screens on the display of the user terminal based on the information about the host may include displaying a video call screen of the host and video call screens of other participants of the group event such that video call screen of the host is larger, on the display of the user terminal, than the video call screens of each of the other participants.

The group event generation request may further include information about whether to use a reminder function, and the method may further include when the reminder function is enabled, receiving a reminder message for the group event through the instant messaging application a first time before the event start time.

According to at least some example embodiments, there is provided a non-transitory computer-readable recording medium storing instructions for causing a computer executing the instructions to perform the method for generating the group event described above.

According to some embodiments of the present disclosure, it is possible to reserve a group event to be started at a future point in time and coordinate schedules among participants through the instant messaging application.

According to some embodiments of the present disclosure, by providing the reminder message as a push notification at a time before the start time of the group event through the instant messaging application, the participants participating in the group event may be reminded so as not to forget the group event.

According to some embodiments of the present disclosure, by providing the participation request as the push notification at the start time of the group event, the users may be guided to immediately check the start time of the group event and to participate in the group event.

The effects of the present disclosure are not limited to the effects described above, and other effects not mentioned will be able to be clearly understood by those of ordinary skill in the art (referred to as "those skilled in the art") from the description of the claims.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 4 is a diagram illustrating an example of reserving a group event using a group event reservation button in a chat room according to at least one example embodiment;

FIG. 5 is a diagram illustrating an example of reserving a group event using an action message in a chat room according to at least one example embodiment;

FIG. 6 is a diagram illustrating an example of reserving a group event using an action message in a 1:1 chat room according to at least one example embodiment;

FIG. 10 is a diagram illustrating an example of adjusting, at a generation terminal, a group event schedule reserved according to at least one example embodiment;

FIG. 12 is a diagram illustrating an example of participating in a group event using a group event participation response button displayed on a display of a user terminal according to at least one example embodiment;

FIG. 13 is a diagram illustrating an example of applying a visual effect to a video call performed through an instant messaging application according to at least one example embodiment;

FIG. 14 is a flow diagram illustrating a method for participating in a group event according to at least one example embodiment; and FIG. 15 is a flow diagram illustrating a method for generating a group event according to at least one example embodiment.

DETAILED DESCRIPTION

Figure 1:
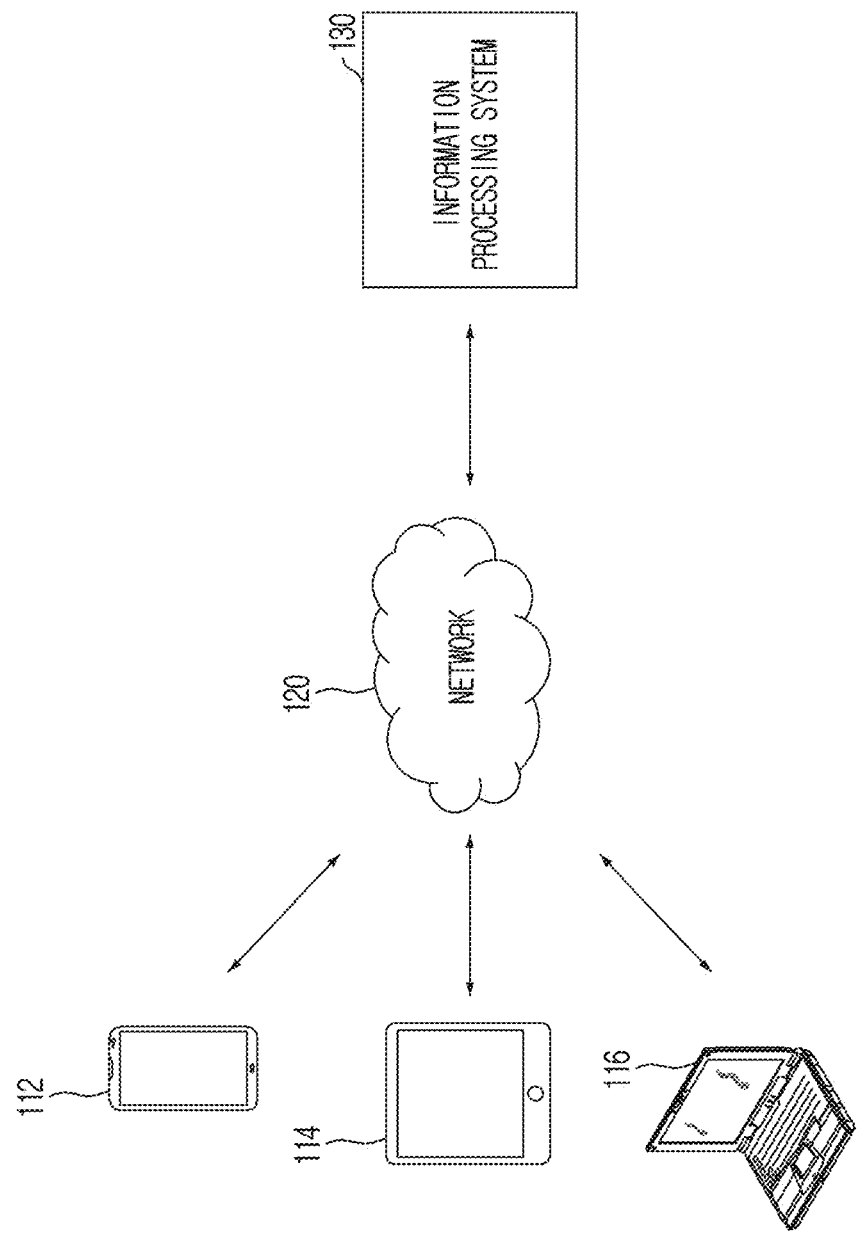
FIG. 1 is a schematic diagram illustrating a configuration in which an information processing system is communicatively connected to a plurality of user terminals to provide a group event scheduling service according to at least one example embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding components are given the same reference numerals. In addition, in the following description of example embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to example embodiments disclosed below, and may be implemented in various different forms, and the present embodiments are merely provided to make the present disclosure complete, and to fully disclose the scope of example embodiments to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in a specific case, a term is arbitrarily selected by the applicant, and the meaning of the term will be described in detail in a corresponding description of example embodiments. Therefore, the terms used in the present disclosure should be defined based on the meaning of the terms and the overall contents of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to be executed by at least one processor. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an embodiment of the present disclosure, the "module" or "unit" may be implemented as a processor and a memory. A "processor" should be interpreted broadly to encompass a central processing unit (CPU), a microprocessor, a digital signal processor (DSP), a controller, a microcontroller, a state machine, and so forth. Processors executing program code are programmed processors, and thus, are special-purpose computers. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory that is integral to a processor is in electronic communication with the processor.

In the present disclosure, a "chat room" may refer to a virtual space or group which may be generated in an instant messaging application installed on a computing device, and which may be participated by one or more users (or user accounts). For example, one or more user accounts may participate in or be included in the chat room and exchange various types of messages, files, and the like. In addition, in the chat room, Voice over Internet Protocol (VoIP) voice call function, VoIP video call function, and live broadcast function (VoIP real time video transmission function) are provided, enabling voice calls, video calls, video streaming, or the like to be performed between user accounts.

In the present disclosure, the "user account" may represent an account generated and used by a user in an instant messaging application or data related thereto. In addition, the user account of the instant messaging application may refer to a user who uses the instant messaging application. Likewise, a user who uses instant messaging or a chat room capable of instant messaging may refer to a user account of the instant application.

As used herein, "push notification" may refer to providing information to be notified to the user of the terminal in the form of an alarm with various effects. The push notification may be transmitted to the user terminal by a push server, and displayed to the user when an application related to the received push notification is installed on the user terminal, When a push notification is received by a user terminal on which an application related to the push notification is installed, the user terminal may provide a notification to the user regardless of whether or not the user is running the application related to the push notification.

FIG. 1 is a schematic diagram illustrating a configuration in which an information processing system 130 is communicatively connected to a plurality of user terminals 112, 114, and 116 to provide a group event scheduling service according to at least one example embodiment. The information processing system 130 may include a system that provides an instant messaging service to a plurality of user terminals 112, 114, and 116 through a network 120. According to an embodiment, the information processing system 130 may include one or more server devices and/or databases, or one or more distributed computing devices and/or distributed databases based on cloud computing services that can store, provide and execute computer-executable programs (e.g., downloadable applications) and data related to the instant messaging service. The instant messaging service provided by the information processing system 130 may be provided to the users through the instant messaging application installed in the plurality of user terminals 112, 114, and 116. For example, the instant messaging service may include a text messaging service, a video call service, a voice call service, a video streaming service, a group event scheduling (reservation) service, and the like, among the user terminals 112, 114, and 116.

In FIG. 1, the mobile phone terminal 112, the tablet terminal 114, and the PC terminal 116 are illustrated as examples of the user terminals, but are not limited thereto, and the user terminal may be any computing device capable of wired and/or wireless communication, and to which an image sensor (e.g., a camera) and a sound sensor (e.g., a microphone) are attached or capable of communicating with the image sensor and the sound sensor, and in which an instant messaging application can be installed and executed. For example, the user terminal may include a smart phone, a mobile phone, a navigation system, a computer, a notebook computer, a digital broadcasting terminal, a personal digital assistant (PDA), a portable multimedia player (PMP), a tablet PC, a game console, a wearable device, an internet of things (IoT) device, a virtual reality (VR) device, an augmented reality (AR) device, and the like. In addition, although FIG. 1 shows that three user terminals 112, 114, and 116 communicate with the information processing system 130 through the network 120, at least some example embodiments are not limited thereto, and a different number of user terminals may be configured to communicate with the information processing system 130 through the network 120.

The method of communication is not limited, and may include a communication method using a communication network (e.g., mobile communication network, wired Internet, wireless Internet, broadcasting network, satellite network, and the like) that may be included in the network 120 as well as short-range wireless communication between user terminals. For example, the network 120 may include any one or more of networks including a personal area network (PAN), a local area network (LAN), a campus area network (CAN), a metropolitan area network (MAN), a wide area network (WAN), a broadband network (BBN), the Internet, and the like. In addition, the network 120 may include any one or more of network topologies including a bus network, a star network, a ring network, a mesh network, a star-bus network, a tree or hierarchical network, and the like, but not limited thereto.

The information processing system 130 may provide the group event scheduling service between user terminals 112, 114, and 116 on which an instant messaging application is running. The group event may be a voice call, a video call, a live broadcast, and the like to which a plurality of users are connected on the instant messaging application, and the user may reserve a group event to be started at a future point in time using the group event scheduling service. According to an embodiment, the user may transmit a group event generation request to the information processing system 130 through the network 120 using the instant messaging application running on the user terminals 112, 114, and 116. In this example, the group event generation request may include various information related to the group event, such as an event start time, an event end time, an event name, a user account to be invited, a call type (e.g., voice call, video call, live broadcast, and the like), a description phrase, an event type (e.g., business meeting, birthday party, and the like), an event host, choice to use participation check, choice to receive a reminder (e.g., a reminder message), and so on.

When the event generation terminal selects to use the participation check function, in response to receiving the group event generation request, the information processing system 130 may transmit an invitation message to the user terminal associated with the invited user account. In one embodiment, the invitation message may include various information for the user to determine whether or not to participate in the group event, such as the event start time, the event end time, the event name, the invited user account, the call type (e.g., voice call, video call, live broadcast, and the like), the description phrase, the event type (e.g., business meeting, birthday party, and the like), the event host, and so on. The invited user terminal may receive an invitation message through an instant messaging application running on the user terminals 112, 114, and 116. For example, the invitation message may be provided in the form of an action message on the instant messaging application, which includes a user interface for inputting whether or not to participate in the group event.

The user terminal receiving the invitation message may check the contents of the invitation message, and then reply whether or not to participate in the group event through the instant messaging application. The information processing system 130 may receive the result of the invitation responses from the invited user terminals and share the information with the other user terminals. With this configuration, the user who has generated the group event may check the results of the invitation responses from the invited users, and then adjust the group event time to ensure that a necessary number of participants will participate, or the like, and the users who have been invited to the group event may determine whether or not to participate in the group event by referring to whether or not the other users will participate.

The information processing system 130 may form a call channel so that, when the event is started at the event start time, all the users invited to the group event, or the users who have accepted the invitation message may make a call (e.g., voice call, video call, and the like) through the instant messaging application. Subsequently, the information processing system 130 may transmit a group event participation request to all the users invited to the group event or to the users who have accepted the invitation message, at a time corresponding to the event start time through the instant messaging application. According to an embodiment, the information processing system 130 may transmit the group event participation request as a push notification. For example, the user terminal may receive the group event participation request from the information processing system 130 and display it on the display in the form of an incoming call notification. The incoming call notification may be a voice incoming call notification, a video incoming call notification, and the like, depending on the call type information included in the group event generation request.

In one embodiment, when the event generation terminal chooses to use the remind function, the information processing system 130 transmits a reminder message for the group event to the user terminal 112, 114, and 116 through the instant messaging application before the time corresponding to the event start time. For example, a reminder message for the group event may be transmitted as a push notification a desired, or alternatively, predetermined time (e.g., 1 hour) before the event start time. The user terminal receiving the reminder message may provide the reminder message to the user in the form of an alarm, a message, or an action message.

As described above, by providing the reminder message as a push notification at a time before the start time of the group event through the instant messaging application, participants participating in the group event may be reminded so as not to forget the group event. In addition, by providing the participation request as the push notification at the start time of the group event, the users may be guided to immediately check the start time of the group event and to participate in the group event.

Figure 2:
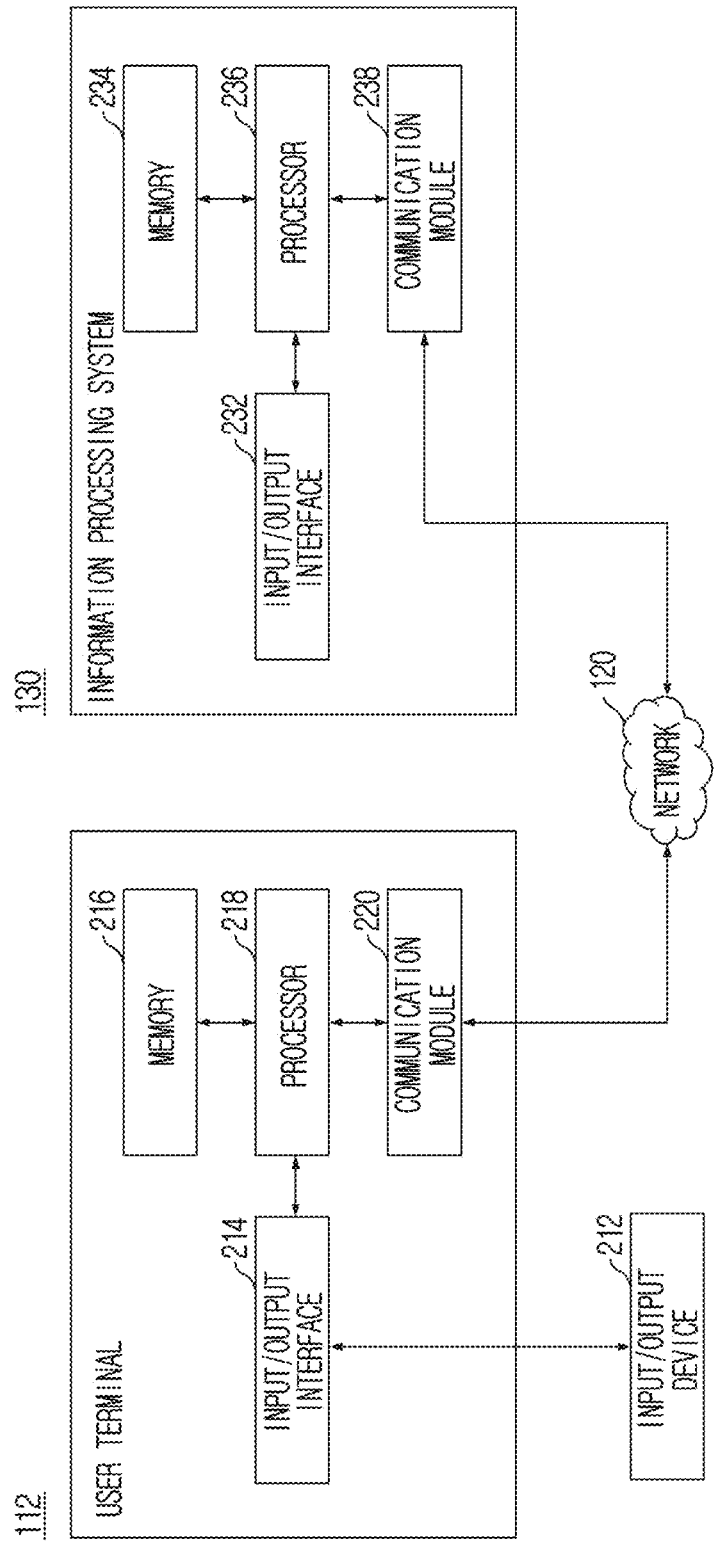
FIG. 2 is a block diagram illustrating an internal configuration of a user terminal and an information processing system according to at least one example embodiment.

FIG. 2 is a block diagram illustrating an internal configuration of the user terminal 112 and the information processing system 130 according to at least one example embodiment. The user terminal 112 may include a memory 216, a processor 218, a communication module 220, and an input and output interface 214. Likewise, the information processing system 130 may include a memory 234, a processor 236, a communication module 238, and an input and output interface 232. As shown in FIG. 2, the user terminal 112 and the information processing system 130 may be configured to communicate information and/or data through the network 120 using the respective communication modules 220 and 238. In addition, the input and output device 212 may be configured to input information and/or data to the user terminal 112 or to output information and/or data generated from the user terminal 112 through the input and output interface 214. In FIG. 2, while the memory 234, the processor 236, the communication module 238, and the input and output interface 232 are shown as the internal configuration of the user terminal 112, other user terminals (e.g., the user terminals 114 and 116 of FIG. 1) may also include the internal configuration identical or similar to the internal configuration of the user terminal 112.

The memories 216 and 234 may include any non-transitory computer-readable recording medium. According to an embodiment, the memories 216 and 234 may include a permanent mass storage device such as random access memory (RAM), read only memory (ROM), disk drive, solid state drive (SSD), flash memory, and the like. As another example, the permanent mass storage device such as ROM, SSD, flash memory, disk drive, and the like is a separate permanent storage device that is distinguished from the memories 216 and 234 and may be included in the user terminal 112 or the information processing system 130. In addition, the memories 216 and 234 may store an operating system and at least one program code (e.g., a code for a browser installed and driven in the user terminal 112 or a dedicated application installed on the user terminal 112 to provide an instant messaging service).

These software components may be loaded from a computer-readable recording medium separate from the memories 216 and 234. Such a separate computer-readable recording medium may include a recording medium directly connectable to the user terminal 112 and the information processing system 130, and may include a computer-readable recording medium such as a floppy drive, a disk, a tape, a DVD/CD-ROM drive, a memory card, and the like, for example. As another example, the software components may be loaded into the memories 216 and 234 through the communication modules 220 and 238 rather than the computer-readable recording medium. For example, at least one program may be loaded into the memories 216 and 234 based on a computer program (for example, the application dedicated to the instant messaging service described above) installed by files provided by developers or a file distribution system for distributing an installation file of an application through the network 120.

The processors 218 and 236 may be configured to process a command of a computer program by performing basic arithmetic, logic, and input and output operations. The command may be provided to the processors 218 and 236 from the memories 216 and 234 or the communication modules 220 and 238. For example, the processors 218 and 236 may be configured to execute the received command according to program code stored in a recording device such as memories 216 and 234.

The communication modules 220 and 238 may provide a configuration or a function for the user terminal 112 and the information processing system 130 to communicate with each other through the network 120, and may provide a configuration or a function for the user terminal 112 and/or the information processing system 130 to communicating with another user terminal or another system (e.g., a separate push notification server, and the like). For example, a request (e.g., a group event generation request) generated by the processor 218 of the user terminal 112 according to the program code stored in the recording device such as the memory 216 may be transmitted to the information processing system 130 through the network 120 under the control of the communication module 220. Conversely, control signals or commands provided under the control of the processor 236 of the information processing system 130 may be received by the user terminal 112 through the communication module 220 of the user terminal 112 via the communication module 238 and the network 120. For example, the user terminal 112 may receive information related to the group event generation request from the information processing system 130 through the communication module 220.

The input and output interface 214 may be a means for interfacing with the input and output device 212. As an example, the input device may include a device such as a camera, a keyboard, a microphone, and a mouse, and the output device may include a device such as a display, a speaker, a haptic feedback device, and the like. As another example, the input and output interface 214 may be a means for interfacing with a device such as a touch screen or the like that integrates a configuration or a function for performing inputting and outputting. For example, when the processor 218 of the user terminal 112 processes command of the computer program loaded in the memory 216, a service screen or content configured using the information and/or data provided by the information processing system 130 or other user terminals may be displayed on the display through the input and output interface 214. The input and output device 212 may be configured as one device with the user terminal 112. In addition, the input and output interface 232 of the information processing system 130 may be a means for interface with a device (not shown) for inputting or outputting that may be connected to, or included in the information processing system 130. In FIG. 2, the input and output interfaces 214 and 232 are illustrated as the components configured separately from the processors 218 and 236, but are not limited thereto, and the input and output interfaces 214 and 232 may be configured to be included in the processors 218 and 236.

The user terminal 112 and the information processing system 130 may include more than those components shown in FIG. 2. Meanwhile, it would be unnecessary to exactly illustrate most of the related components. According to an embodiment, the user terminal 112 may be implemented to include at least some of the input and output devices described above. In addition, the user terminal 112 may further include other components such as a transceiver, a global positioning system (GPS) module, a camera, a microphone, various sensors, a database, and the like. For example, when the user terminal 112 is a smartphone, it may generally include components included in the smartphone, and for example, it may be implemented such that various components such as an acceleration sensor or a gyro sensor, a camera module, a microphone module, various physical buttons, buttons using a touch panel, input/output ports, a vibrator for vibration, and the like are further included in the user terminal 112.

According to an embodiment, the processor 218 of the user terminal 112 may be configured to operate an instant messaging application or a web browser application that provides a group event scheduling. In this case, a program code associated with the application may be loaded into the memory 216 of the user terminal 112. While the application is running, the processor 218 of the user terminal 112 may receive information and/or data provided from the input and output device 212 through the input and output interface 214 or receive information and/or data from the information processing system 130 through the communication module 220, and process the received information and/or data and store it in the memory 216. In addition, such information and/or data may be provided to the information processing system 130 through the communication module 220.

According to an embodiment, while the instant messaging application is running, the processor 218 may receive texts, images, sounds, and so on, which may be input or selected through the input device such as a touch screen, a keyboard, or the like connected to the input and output interface, and store the received texts, images, sounds, and so on in the memory 216 or provide them to the information processing system 130 through the communication module 220 and the network 120. For example, the processor 218 may receive information for generating the group event generation request through an input device such as a touch screen or a keyboard. Accordingly, the received texts, images, sounds, and so on may be provided to the information processing system 130 through the communication module 220 and the network 120.

The processor 218 may be configured to output the processed information and/or data through an output device such as a device capable of outputting a display (e.g. touch screens, displays, and the like) of the user terminal 112 or a device capable of outputting an audio (e.g., a speaker). According to an embodiment, information and/or data provided by the instant messaging application or the web browser application may be displayed through the device capable of outputting a display, or the like. According to another embodiment, information and/or data provided by the instant messaging application or the web browser application may be output through the device capable of outputting an audio, or the like.

According to an embodiment, the processor 236 of the information processing system 130 may be configured to manage, process, and/or store the information and/or data received from a plurality of user terminals including the user terminal 112 and/or a plurality of external systems. For example, the processor 236 may be configured to generate a group event based on the group event generation request received from a plurality of user terminals and store the related information. As another example, the processor 236 may be configured to transmit a reminder message and a participation request related to the generated group event to the user terminal 112. Hereinafter, a detailed description will be given of a specific method in which the processor 236 of the information processing system 130 provides a group event scheduling service based on the group event generation request.

Figure 3:
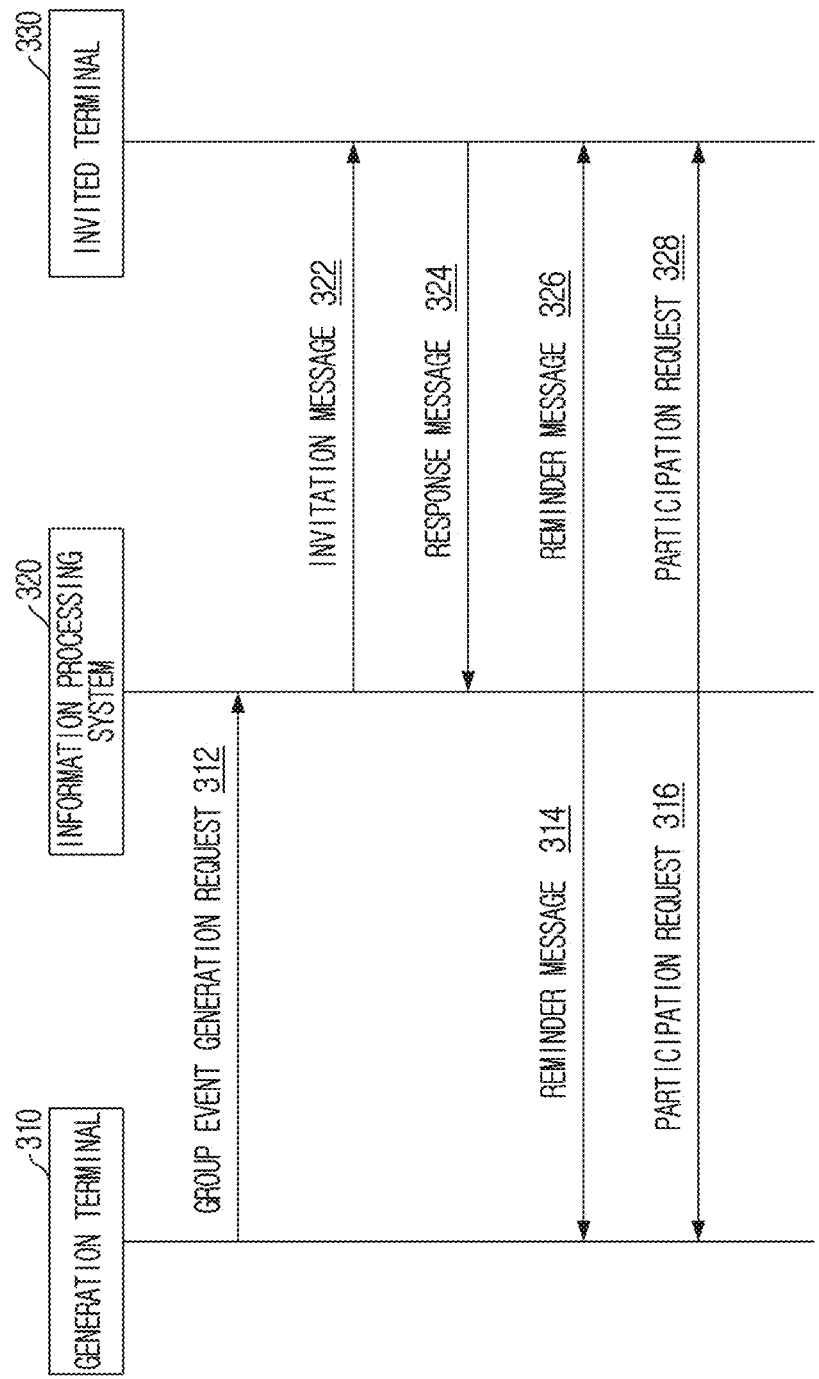
FIG. 3 is a flow diagram illustrating a method of providing a group event scheduling service between a generation terminal, an information processing system, and an invited terminal according to at least one example embodiment.

FIG. 3 is a flow diagram illustrating a method of providing the group event scheduling service between a generation terminal 310, an information processing system 320, and an invited terminal 330 according to at least one example embodiment. As illustrated, the generation terminal 310 may transmit a group event generation request 312 to the information processing system 320 using an instant messaging application operating in the generation terminal. In one embodiment, the group event generation request 312 may include various information related to the group event, such as an event start time, an event end time, an event name, a user account to be invited, a call type (e.g., voice call, video call, live broadcast, and the like), a description phrase, an event type (e.g., business meeting, birthday party, and the like).

In response to receiving the group event generation request 312 from the generation terminal 310, the information processing system 320 may transmit an invitation message 322 to the invited terminal 330 through the instant messaging application. Here, the invited terminal 330 may be a user terminal that is invited by the user of the generation terminal 310 and that is associated with a user account included in the group event generation request 312. In one embodiment, the invitation message 322 may include various information for the user to determine whether or not to participate in the group event, such as the event start time, the event end time, the event name, the invited user account, the call type (e.g., voice call, video call, live broadcast, and the like), the description phrase, the event type (e.g., business meeting, birthday party, and the like), the event host, and so on.

In response to receiving the invitation message 322 from the information processing system 320, the invited terminal 330 may transmit a response message 324 to the information processing system 320 through the instant messaging application. The response message 324 may be an acceptance message, a declination message, an undecided message, or the like. According to an embodiment, based on the user selecting an acceptance message, the invited terminal 330 may transmit the response message 324 to the information processing system 320 and also may automatically register the group event schedule in a calendar application (or calendar module) capable of managing user schedules, which may be provided in the instant messaging application. Additionally or alternatively, the invited terminal 330 may automatically register the group event schedule in a calendar application separate from the instant messaging application.

In one embodiment, the response message 324 of the invited terminal 330 may be provided to the generation terminal 310 and the other invited terminals in real time through the instant messaging application. In this case, the user of the generation terminal 310 may check the participation status of the invited users and then, if necessary, modify the information about the group event (e.g., event start time or the like). When modifying the information about the group event, the information processing system 320 may transmit a modified invitation message (not shown) to the invited terminal 330 through the instant messaging application, and receive a modified response message (not shown).

The information processing system 320 may transmit reminder messages 314 and 326 for group events to the generation terminal 310 and the invited terminal 330 based on the response message received from the invited terminal 330 through the instant messaging application. According to an embodiment, the reminder messages 314 and 326 may be transmitted to the generation terminal 310 and the invited terminal 330 a desired, or alternatively, predetermined time of period (e.g., 1 hour) before the start time of the group event. Here, it is preferable that the reminder messages 314 and 326 include the information about the event start time, the event name, and the like in order to remind the participants participating in the group event of the start time of the group event.

In addition, the information processing system 320 may transmit group event participation requests 316 and 328 to the generation terminal 310 and the invited terminal 330 through the instant messaging application at a time corresponding to the event start time. According to an embodiment, at a time corresponding to the event start time, the information processing system 320 may transmit a push notification to a user account that responded to participate in the corresponding group event and to the user account that generated the group event. In this case, the generation terminal 310 and the invited terminal 330 may display the received group event participation request on the display in the form of an incoming call notification.

In FIG. 3, it is illustrated that one invited terminal 330 receives the invitation message 322 from the information processing system 320, but is not limited thereto. For example, a plurality of invited terminals may receive the invitation message 322 from the information processing system 320. That is, when there are a plurality of user accounts that are invited by the user of the generation terminal 310 and included in the group event generation request 312, the information processing system 320 may transmit the invitation message, the reminder message, and the participation request to each of the invited terminals.

FIG. 4 is a diagram illustrating an example of reserving the group event using a group event reservation button 418 in a chat room according to at least one example embodiment. The user may reserve the group event through a first operation 410, a second operation 420, and a third operation 440, using the instant messaging application running on the user terminal. In one embodiment, the user may reserve the group event using the group event reservation button 418 provided in a group chat room of the instant messaging application.

The first operation 410 represents that the user selects the group event reservation button 418 displayed in the group chat room in order to transmit the group event generation request to the information processing system through the instant messaging application. As illustrated, on the screen of the group chat room, a button 412 for immediately starting a voice call with the users in the group chat room, a button 414 for immediately starting a video call, and a button 416 for immediately starting a live broadcast, and a group event reservation button 418 may be displayed. When the user selects the group event reservation button 418 with a touch input or the like, a user interface for reserving a group event may be displayed.

The second operation 420 represents transmitting a group event generation request to the information processing system using the user interface for reserving a group event. As illustrated, the user may input, with a touch input or the like, an event name 422, an event start time 424, an event end time 426, a call type 428 (e.g., voice call, video call, live broadcast, and the like), or a description phrase 432. For example, when the user wants to automatically perform a video call "Brown's Birthday Party" at a specific time in the future, the user may enter, with a touch input, a typing input, and the like, the group event name "Brown's Birthday Party", the event start time "Thursday, Nov. 28, 2019, 7:00 PM", the event end time "Thursday, Nov. 28, 2019, 8:00 PM", the call type "video call", and the description phrase "How about celebrating Brown's birthday in the evening?".

In one embodiment, the user may select a participation confirmation button 434 with a touch input or the like. In this case, the information processing system may be configured to transmit an invitation message to the invited users through the instant messaging application, and transmit a group event participation request only to the users who accepted the invitation. Meanwhile, when the participation check function is disabled, the information processing system may transmit a group event participation request to all invited users without collecting the results of the invitation responses of the invited users. In addition, when the user selects a remind button 436 with a touch input or the like, the information processing system may transmit a reminder message for reminding the start time of the group event to the users or the participants through the instant messaging application before the event start time.

After inputting necessary information using the user interface for reserving a group event, the user may select a done button 438 with a touch input or the like, and transmit the group event generation request to the information processing system through the instant messaging application. In one embodiment, the group event generation request may include information about the event name, the event start time, the event end time, the call type, the description phrase, choice to use participation check function, and choice to use the remind function, input by the user. In response to receiving the group event generation request, the information processing system may transmit, to the invited user account, an invitation message to invite to the group event through the instant messaging application.

The third operation 440 represents an invitation message 442 displayed on the group chat room screen. For example, the invitation message 442 may be provided in the form of an action message on the instant messaging application including a user interface for moving to a screen where detailed contents of the group event can be checked. Additionally or alternatively, the invitation message 442 may be provided in the form of an action message on the instant messaging application, which includes a user interface for inputting whether or not to participate in the group event (e.g., accept, decline, undecided, and the like). In one embodiment, the information processing system may display the invitation message 442 in the group chat room in such a form that the user account (e.g., "James") that transmitted the group event generation request enters the invitation message 442 to the group chat room. In this case, the invitation message 442 may include the message "Group event generated" along with the information such as the event name, the call type, the event start time, and so on.

In one embodiment, the information processing system may transmit the invitation message 442 to all user accounts included in the group chat room (e.g., "Sally", "Cony", "Moon", "Brown" and "James"). In another embodiment, the information processing system may transmit the invitation message 442 to the other user accounts (e.g., "Sally", "Cony", "Moon", and "Brown") excluding the user account (e.g., "James") that transmitted the group event generation request. In this case, the information processing system may determine that the user account (e.g., "James") that transmitted the group event generation request accepted the group event.

In FIG. 4, it is illustrated that all user accounts included in the group chat room are automatically invited to the group event, but is not limited thereto, and a user interface may be provided, allowing the user to select a user to be invited to the group event. For example, in the user interface for selecting a user to be invited to the group event, "James", "Sally", "Cony", "Moon" and "Brown", which are included in the group chat room, may be displayed as selected, and the user may additionally select another user with a touch input or the like, or deselect default selected users (e.g., "Sally", "Cony", "Moon", and "Brown").

Alternatively or additionally, a user interface may be provided, which allows the user to select a user to invite to the group event from a contacts list. At this time, when there is no chat room available, that includes both the user and the user selected through the user interface, a group chat room may be automatically generated, which includes the user and the user selected through the user interface, and the members of the generated group chat room may be associated with the group event.

Additionally, the user may input information about the event type (e.g., business meeting, birthday party, and the like) and the event host using the user interface for reserving a group event. For example, the user may select the group event type as "Birthday party". In addition, the user may select the birthday boy "Brown" as the event host. In this case, a video call screen of "Brown" may be displayed in the center of the display of the user terminal, or the video call screen of "Brown" may be displayed larger than the video call screen of the other participants. Additionally, visual effects (background screen, emoticons, animation effects, and the like) and sound effects (background music, sound effects, and the like) suitable for the event type of "birthday party" may be applied to the group event.

FIG. 5 is a diagram illustrating an example of reserving a group event using an action message 512 in a chat room according to at least one example embodiment. The user may reserve a group event through a first operation 510 and a second operation 520, using the instant messaging application running on the user terminal. The first operation 510 represents that the user selects an action message 512 related to a group video call that terminated in a group chat room of the instant messaging application using a touch input or the like.

The second operation 520 represents that, in response to the user selecting the action message 512 related to the group video call that terminated, a user interface 522 for starting a new call is displayed on the display of the user terminal. The user interface 522 may include a button 524 for immediately starting a voice call with users in the group chat room, a button 526 for immediately starting a video call, and a button 528 for reserving a group event. When the user selects the button 528 for reserving a group event with a touch input or the like, the user interface (see 420 in FIG. 4) for reserving a group event may be displayed on the display of the user terminal. In this case, the users in the corresponding group chat room may be automatically selected as the users invited to the group event.

FIG. 6 is a diagram illustrating an example of reserving a group event using an action message 612 in a 1:1 chat room according to at least one example embodiment. The user may reserve a group event through a first operation 610 and a second operation 620, using the instant messaging application running on the user terminal. The first operation 610 represents that the user selects, using a touch input or the like, an action message 612 related to an unanswered voice call in the 1:1 chat room of the instant messaging application.

The second operation 620 represents that, in response to the user selecting the action message 612 related to the voice call that the other party has not answered, the user interface 622 for starting a new call is displayed on the display of the user terminal. The user interface 622 may include a button 624 for immediately starting a voice call with users in the 1:1 chat room, a button 626 for immediately starting a video call, and a button 628 for reserving a group event. When the user selects the button 628 for reserving a group event with a touch input or the like, the user interface (see 420 in FIG. 4) for reserving a group event may be displayed on the display of the user terminal. In this case, the users in the corresponding group chat room may be automatically selected as the users invited to the group event.

Figure 7:
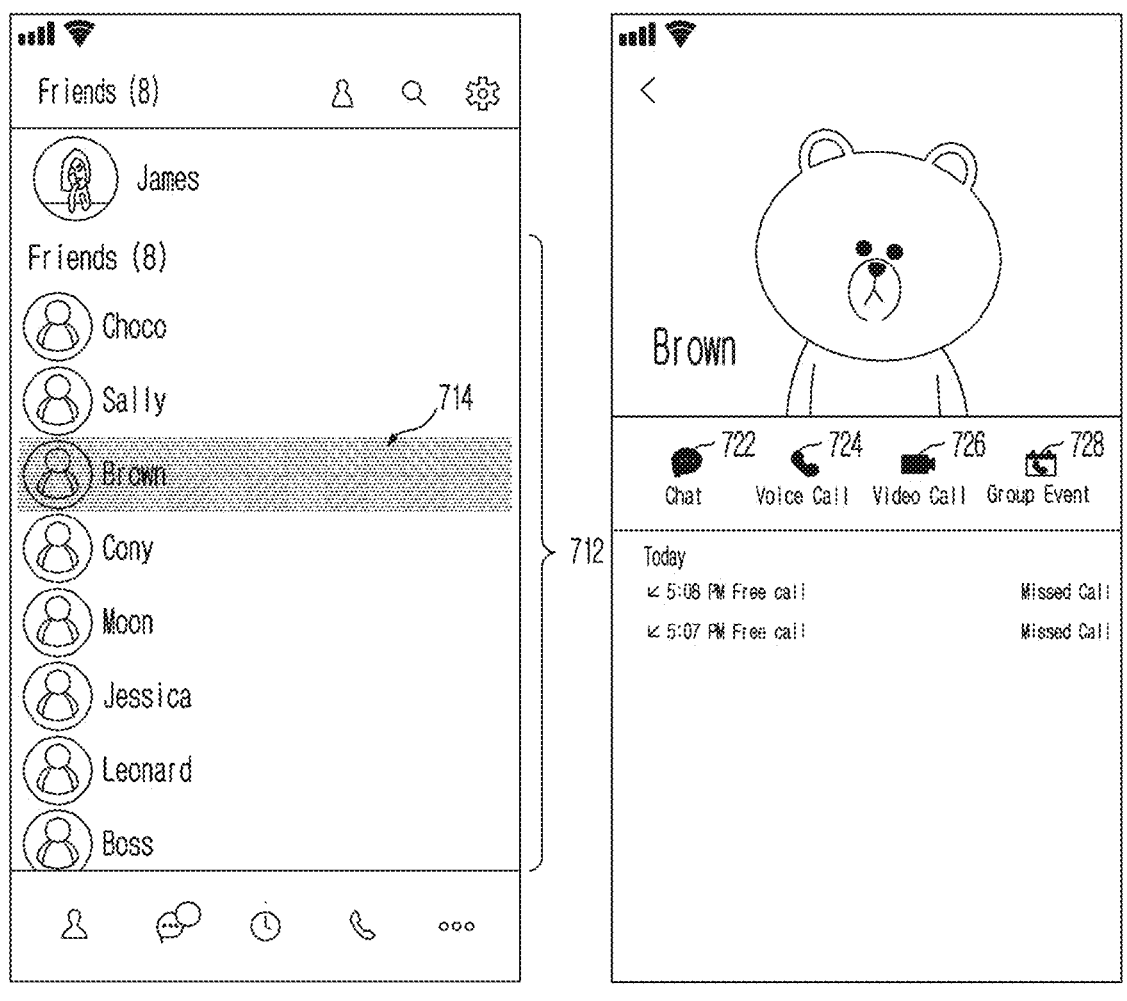
FIG. 7 is a diagram illustrating an example of reserving a group event using a button for reserving a group event in a user's profile screen according to at least one example embodiment.

FIG. 7 is a diagram illustrating an example of reserving a group event using a button 728 for reserving a group event in a user's profile screen according to at least one example embodiment. The user may reserve a group event through a first operation 710 and a second operation 720, using the instant messaging application running on the user terminal. The first operation 710 represents that the user (e.g., "James") selects one user account 714 from the contacts list 712.

The second operation 720 represents that, in response to the user selecting one user account 714 from the contacts list 712, the profile screen of the user (e.g., "Brown") is displayed on the display of the user terminal. The profile screen may include a button 722 for generating a 1:1 chat room with the user (e.g., "Brown"), a button 724 for immediately starting a voice call, a button 726 for immediately starting a video call, and a button 728 for reserving a group event. When the user selects the button 728 for reserving a group event with a touch input or the like, the user interface (see 420 in FIG. 4) for reserving a group event may be displayed on the display of the user terminal. In this case, the corresponding user (e.g., "Brown") may be automatically selected as a user invited to the group event.

Figure 8:
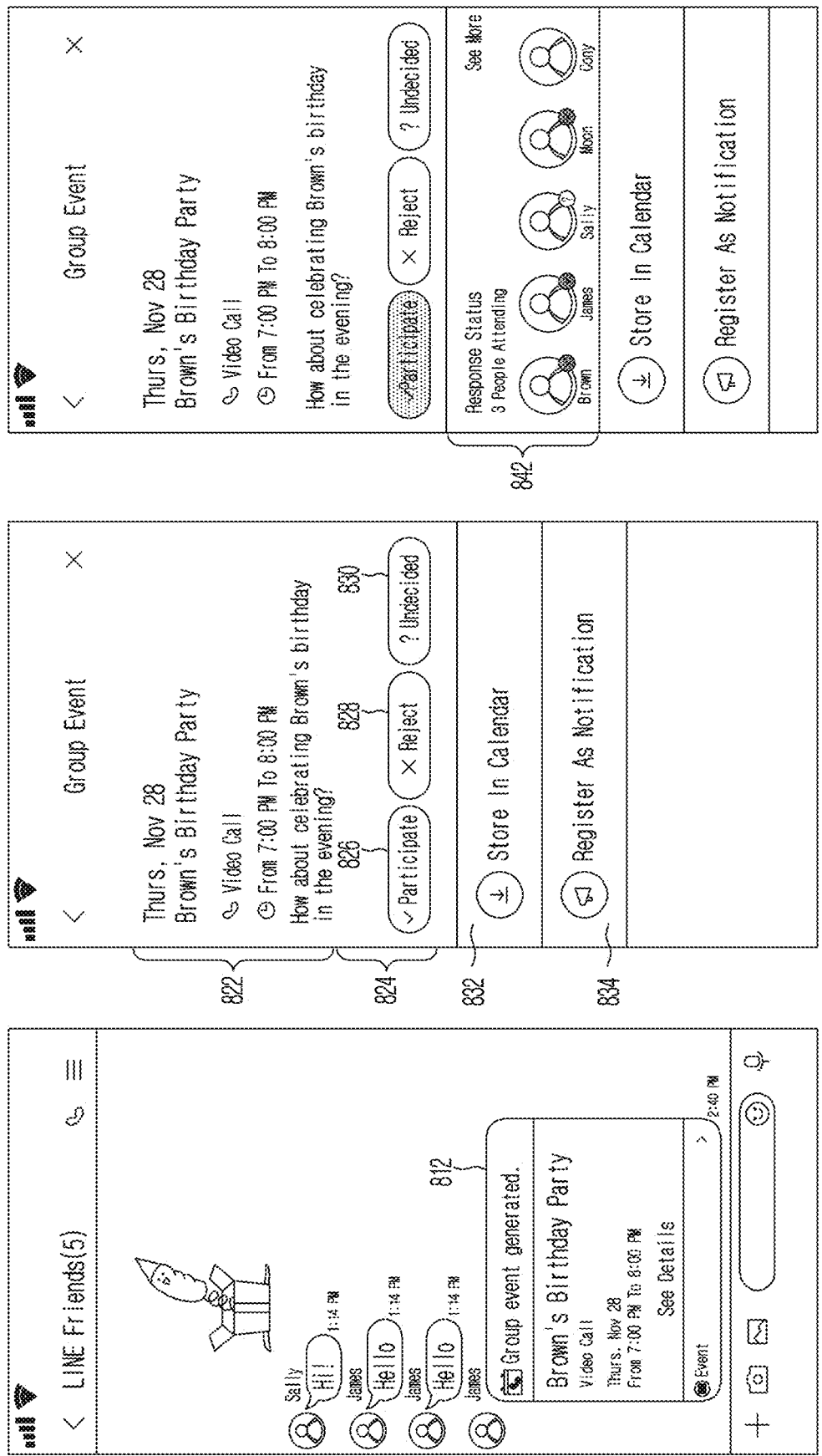
FIG. 8 is a diagram illustrating an example of accepting, at an invited terminal, a group event invitation according to at least one example embodiment.

FIG. 8 is a diagram illustrating an example of accepting, at the invited terminal, a group event invitation according to at least one example embodiment. The user may accept the group event invitation through a first operation 810, a second operation 820, and a third operation 840, using the instant messaging application running on the user terminal. The first operation 810 represents that the invited terminal displays an invitation message 812 received through the instant messaging application on the display.

As illustrated, the invitation message 812 may be provided in the form of an action message on the instant messaging application including a user interface for moving to a screen where detailed contents of the group event can be checked. In one embodiment, the invitation message 812 may include the information such as the message "Group event generated", the event name (e.g., "Brown's Birthday Party"), the call type (e.g., video call), the event start time (e.g., "Thursday, November 28, 7:00 pm-8:00 pm)", and so on. By selecting the invitation message 812 with a touch input or the like, the user may move to a screen on which detailed contents of the group event can be checked.

The second operation 820 represents a screen on which the detailed contents of the group event can be checked. As illustrated, in a first area 822 of the screen, information about the group event (e.g., event name, call type, event start time, event end time, description phrase, event type, and the like) may be displayed for the user who received the invitation message so that the user can determine whether or not to participate in the group event. In addition, a participation button 826, a declination button 828, and an undecided button 830 for responding to the invitation may be displayed in a second area 824 of the screen.

In one embodiment, the user may select the "Store In Calendar" button 832 with a touch input or the like, and store a corresponding group event schedule in the calendar application. The calendar application may be an additional function provided within the instant messaging application, or may be a separate application independent from the instant messaging application. In addition, the user may register a message related the group event as a notification for the group chat room, by selecting a "Register As Notification" button 834 with a touch input or the like. Alternatively, in response to the user selecting the participation button 826, the invited terminal may transmit an acceptance message to the information processing system and also automatically store the group event schedule in the calendar application. In this example, the calendar application may be a calendar application (or a calendar module) that can manage user schedules provided in the instant messaging application, or may be a calendar application separate from the instant messaging application.

The third operation 840 represents that the information about the other invited people and the result of the invitation response are displayed on the screen in response to the user selecting the participation button 826. For example, a profile picture, a nickname, and results of invitation responses from the invited users (e.g., acceptance, declination, undecided, unanswered) for all user accounts (e.g., "Brown", "James", "Sally", "Moon", "Cony") invited to the group event "Brown's Birthday Party" may be displayed in a third area 842 of the screen. The result of the invitation response selected by the user in the second operation 820 may be transmitted to the information processing system in real time through the instant messaging application. In one embodiment, the information processing system may provide the received result of the invitation response to the other users through the instant messaging application.

In FIG. 8, it is illustrated that, when the user selects the participation button 826, information of the other invited people and the result of the invitation response are displayed on the screen, but at least some example embodiments are not limited thereto, and even when the user does not input the invitation response, information of the other invited people and the result of the invitation response may still be displayed on the screen where detailed contents of the group event can be checked.

Figure 9:
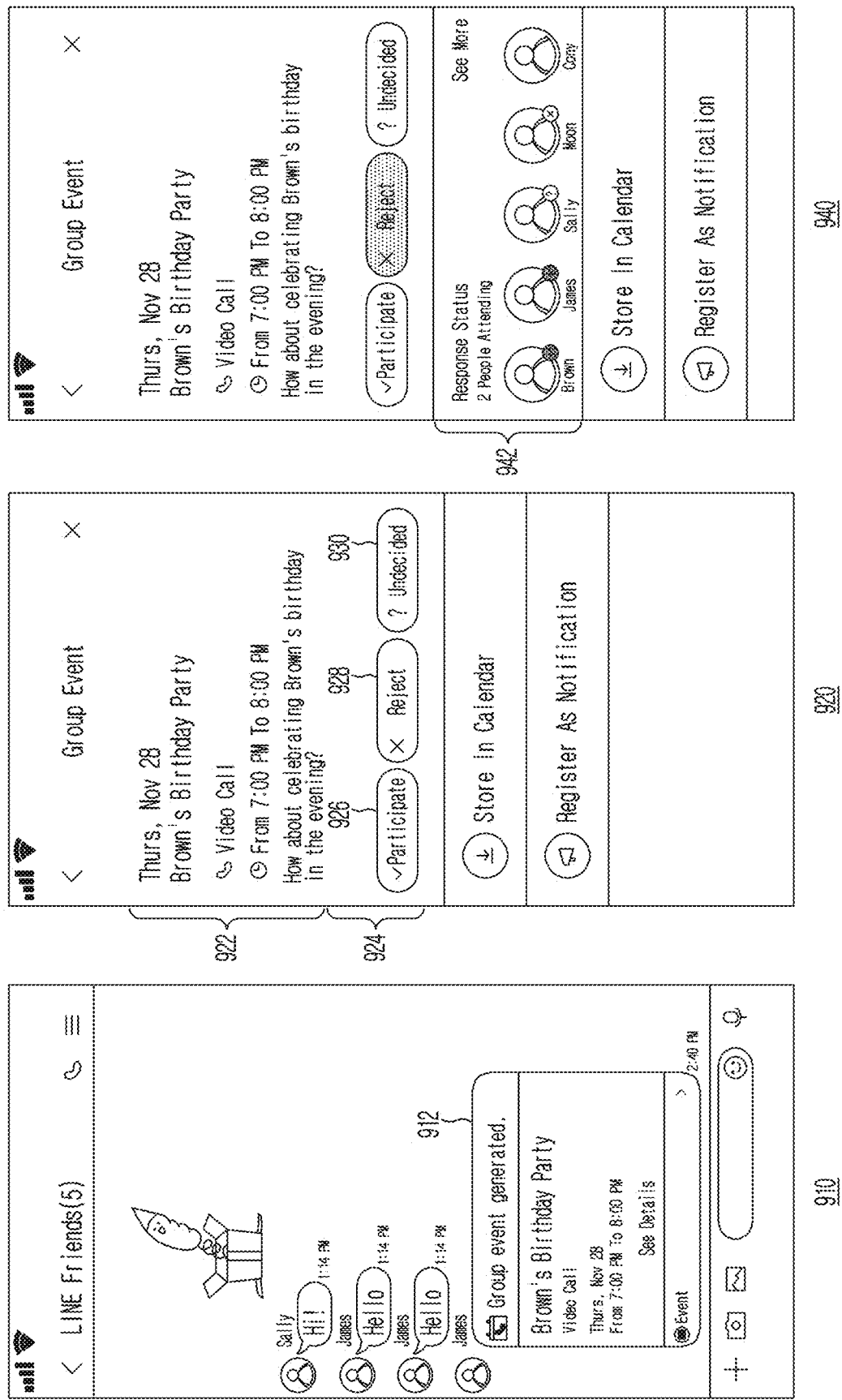
FIG. 9 is a diagram illustrating an example of declining, at an invited terminal, a group event invitation according to at least one example embodiment.

FIG. 9 is a diagram illustrating an example of declining, at the invited terminal, a group event invitation according to at least one example embodiment. The user may decline the group event invitation through a first operation 910, a second operation 920, and a third operation 940, using the instant messaging application running on the user terminal. The first operation 910 represents that the invited terminal displays an invitation message 912 received through the instant messaging application on the display.

As illustrated, the invitation message 912 may be provided in the form of an action message on the instant messaging application including a user interface for moving to a screen where detailed contents of the group event can be checked. In one embodiment, the invitation message 912 may include the information such as the message "Group event generated", the event name (e.g., "Brown's Birthday Party"), the call type (e.g., video call), the event start time (e.g., "Thursday, November 28, 7:00 pm-8:00 pm)", and so on. By selecting the invitation message 912 with a touch input or the like, the user may move to a screen on which detailed contents of the group event can be checked.

The second operation 920 represents a screen on which the detailed contents of the group event can be checked. As illustrated, in a first area 922 of the screen, information about the group event (e.g., event name, call type, event start time, event end time, description phrase, event type, and the like) may be displayed for the user who received the invitation message so that the user can determine whether or not to participate in the group event. In addition, a participation button 926, a declination button 928, and an undecided button 930 for responding to the invitation may be displayed in a second area 924 of the screen.

The third operation 940 represents that the information about the other invited people and the result of the invitation response are displayed on the screen in response to the user selecting the declination button 928. For example, a profile picture, a nickname, and results of invitation responses from the invited users (e.g., acceptance, declination, undecided, unanswered) for all user accounts (e.g., "Brown", "James", "Sally", "Moon", "Cony") invited to the group event "Brown's Birthday Party" may be displayed in a third area 942 of the screen. The result of the invitation response selected by the user in the second operation 920 may be transmitted to the information processing system in real time through the instant messaging application. In one embodiment, the information processing system may provide the received result of the invitation response to the other users through the instant messaging application.

In FIG. 9, it is illustrated that, when the user selects the declination button 928, information of the other invited people and the result of the invitation response are displayed on the screen, but at least some example embodiments are not limited thereto, and even when the user does not input the invitation response, information of the other invited people and the result of the invitation response may still be displayed on the screen where detailed contents of the group event can be checked.

In addition, in FIG. 9, it is illustrated that the invitation message 912 is provided in the form of an action message in the chat room that includes the invited users, but at least some example embodiments are not limited thereto. For example, the invitation message 912 may be provided in the form of a message (or action message) in a personal chat room (e.g., my own chat room, or the like) or a chat room with a schedule bot.

Figure 10:
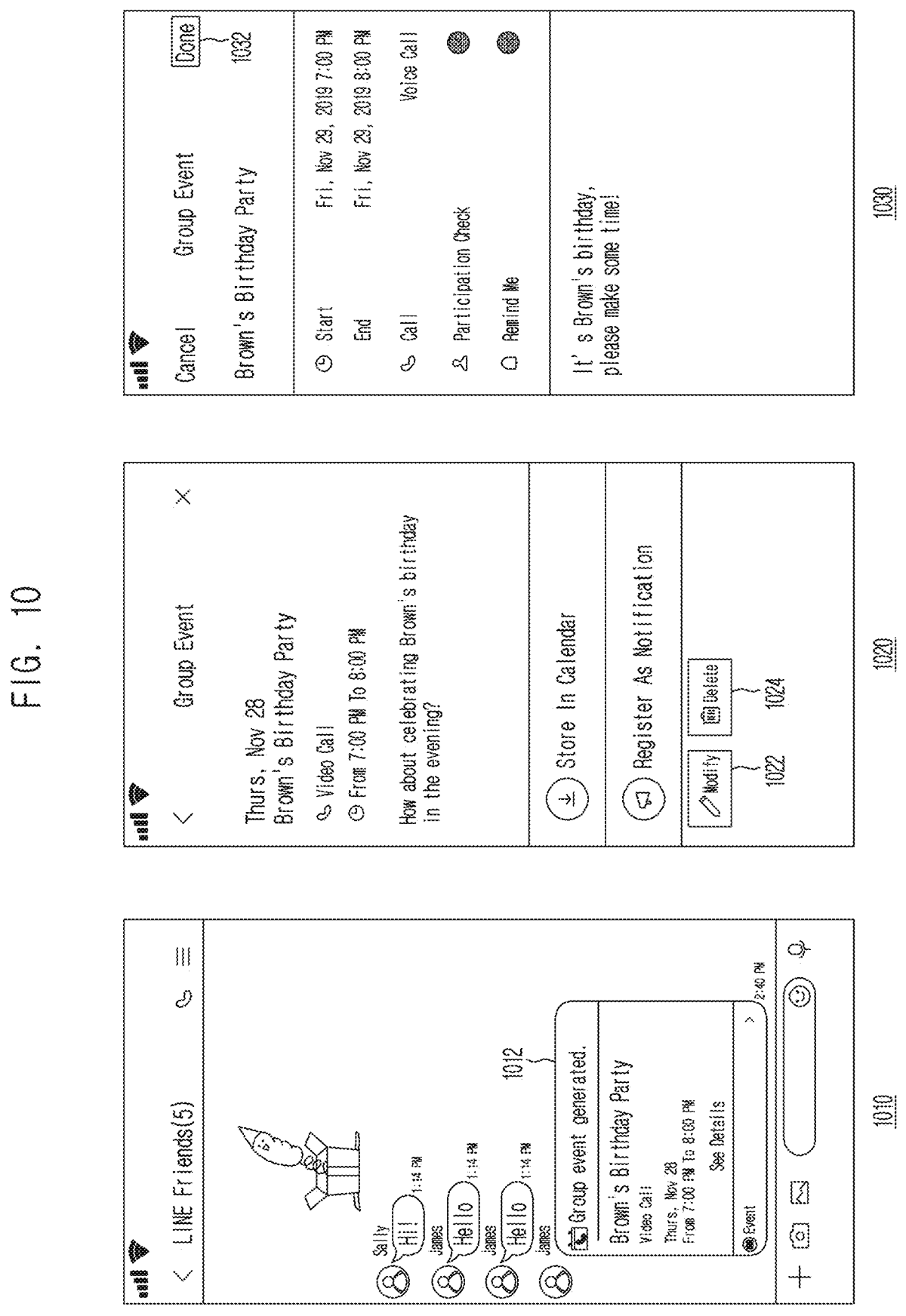

FIG. 10 is a diagram illustrating an example of adjusting, at a generation terminal, a group event schedule reserved according to at least one example embodiment. The generation terminal may modify the reserved group event through a first operation 1010, a second operation 1020, and a third operation 1030, using the instant messaging application. In one embodiment, the generation terminal may modify not only the group event schedule, but also information related to the group event, such as the event name, the user account to be invited, the call type, the description phrase, the event type, the event host, choice to use participation check, choice to use remind function, and so on.

The first operation 1010 represents that the user of the generation terminal (e.g., "James") selects an action message 1012 displayed in the group chat room in order to move to a user interface through which detailed contents related to a reserved group event can be checked. In response to the user selecting the action message 1012, a user interface for confirming detailed contents related to the reserved group event may be displayed on the display of the generation terminal.

The second operation 1020 represents that the user of the generation terminal (e.g., "James") selects a modify button 1022 included in the user interface where the detailed contents related to the group event can be checked, in order to modify the information related to the group event. As illustrated, the user interface for checking the detailed contents related to the group event may also display an edit button 1022 and a delete button 1024, in addition to the event start time, the event end time, the event name, the call type, and the description phrase. When the user selects the edit button 1022 with a touch input, a user interface for correcting information related to the group event may be displayed on the display. On the other hand, when the user selects the delete button 1024 with a touch input, the corresponding group event may be deleted. In this case, the information processing system may transmit a message notifying the deletion of the group event to the users related to the group event through the instant messaging application.

In one embodiment, the user of the generation terminal (e.g., "James") may check the results of the invitation responses from the users invited to the group event. The results of the invitation responses from the invited users may be transmitted to the user of the generation terminal in real time or may be transmitted upon request of the user of the generation terminal. In this case, the user of the generation terminal may check the results of the invitation responses from the invited users, modify information related to the group event, or delete the group event.

The third operation 1030 represents that a user interface for modifying the group event is displayed on the display of the generation terminal in response to the user of the generation terminal (e.g., "James") selecting the modify button 1022. As illustrated, the user may modify the event name, the event start time, the event end time, the call type, choice to use participation check function, choice to use remind function, the description phrase, and the like, with a touch input or the like. For example, when the responses from the invited users are insufficient or when there are few users accepting to participate, the user of the generation terminal may modify the event start time from "Thursday, Nov. 28, 2019, 7:00 PM" to "Friday, Nov. 29, 2019, 7:00 PM", the event end time from "Thursday, Nov. 28, 2019, 8:00 PM" to "Friday, Nov. 29, 2019, 8:00 PM", the call type from video call to voice call, and the description phrase from "How about celebrating Brown's birthday in the evening?" to "It's Brown's birthday, please make some time!".

After the user corrects the information related to the group event, by selecting the done button 1032 with a touch input or the like, the generation terminal may transmit the modified group event generation request to the information processing system through the instant messaging application. In this case, the information processing system may transmit the modified group event invitation message to the invited user accounts through the instant messaging application, and receive responses to the invitation from the invited users again. Thereafter, the information processing system may transmit the reminder message to the related users through the instant messaging application before the time corresponding to the modified event start time, and transmit a group event participation request to the related users through the instant messaging application at a time corresponding to the modified event start time.

Figure 11:
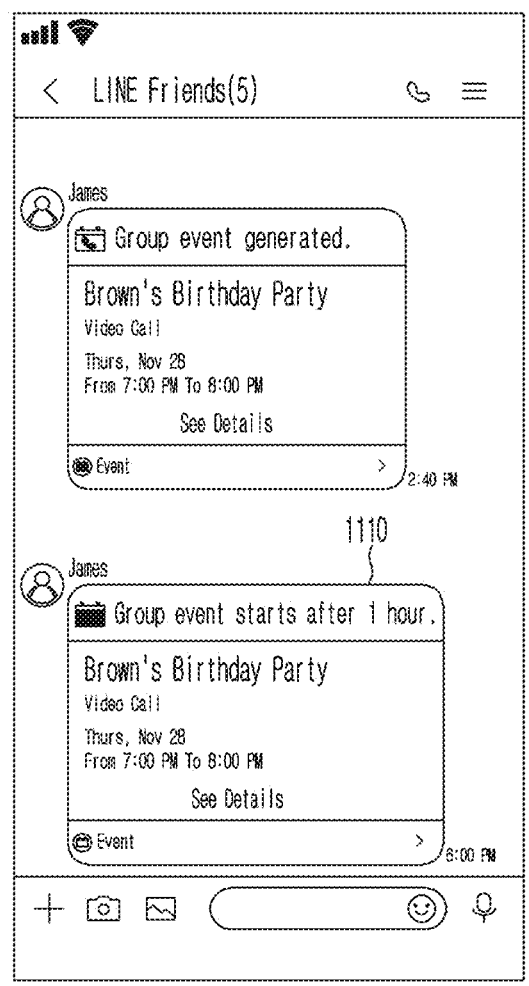
FIG. 11 is a diagram illustrating an example of displaying, at a user terminal, a reminder message received from an information processing system in a chat room through an instant messaging application according to at least one example embodiment.

FIG. 11 is a diagram illustrating an example of displaying, at the user terminal, a reminder message 1110 received from the information processing system in the chat room through the instant messaging application according to at least one example embodiment. When the user selects to use the remind function through the instant messaging application, the information processing system may transmit the reminder message 1110 for the group event to the invited terminal through the instant messaging application before the time corresponding to the event start time. In one embodiment, the information processing system may transmit the reminder message 1110 for the group event as a push notification a desired, or alternatively, predetermined time (e.g., 1 hour) before the event start time.

For example, at 6 PM on Nov. 28th, 2019, which is one hour before 7 PM on Nov. 28th, 2019 that is the start time of the group event "Brown's Birthday Party", the information processing system may transmit the reminder message 1110 to the related user terminal (e.g., to all invited user accounts or to user terminals associated with the user accounts that accepted the invitation) through the instant messaging application. The time of transmitting the reminder message 1110 may be automatically determined by the information processing system. Alternatively, the time of transmitting the reminder message 1110 may be determined based on the group event generation request received from the generating terminal.

As illustrated, the user terminal may provide the reminder message 1110 to the user in the form of an action message in the chat room, for example. The reminder message 1110 may include the message "Group event starts after 1 hour" and information such as the event name (e.g., "Brown's Birthday Party"), the call type (e.g., video call), the event schedule (e.g., "Thursday, November 28, 7:00 pm-8:00 pm"), and so on. In another embodiment, the user terminal may provide the reminder message 1110 to the user in the form of an alarm, a message, a voice guide, and so on, for example.

In one embodiment, by selecting the reminder message 1110 with a touch input or the like, the user may move to a screen on which detailed contents of the group event can be checked. By providing the reminder message 1110 as a push notification at a time before the start time of the group event through the instant messaging application, participants of the group event may be reminded so as not to forget the group event.

FIG. 12 is a diagram illustrating an example of participating in the group event using a group event participation response button 1218 displayed on the display of the user terminal according to at least one example embodiment. The user may participate in the group event through a first operation 1210 and a second operation 1220 at the user terminal. In one embodiment, the information processing system may transmit a group event participation request as a push notification to the related users at the event start time through the instant messaging application. For example, the information processing system may transmit the group event participation request to the user terminals of the user accounts (e.g., "Brown", "James", "Sally", "Moon") that accepted the invitation of the group event "Brown's Birthday Party".

The first operation 1210 represents that the user terminal displays a video call incoming screen on the display of the user terminal in response to receiving the group event participation request. The video call incoming screen may include the group event name (e.g., "Brown's Birthday Party"), the call type (e.g., video call), a view later button 1212, a message button 1214, a declination button 1216, and a response button 1218. The user may enter into the group event (e.g., "Brown's Birthday Party" performed on video call) by selecting the response button 1218 with a touch input or the like. On the other hand, the user may not enter into the group event by selecting the declination button 1216 with a touch input or the like.

In one embodiment, the user may select the view later button 1212 to postpone the group event participation request. For example, the user may select the view later button 1212 to set the information processing system to re-retransmit the group participation request after a certain period of time elapses (e.g., 5 minutes later). For example, in response to receiving, by the user terminal, a request from the user to postpone the group event participation request (e.g., a selection of the view later button 1212 by the user), the user terminal may receive the group event participation request again, through the instant messaging application, after a desired or, alternatively, predetermined period of time elapses. When receiving the group participation request a second time after the certain period of time elapses, the user terminal may display the video call incoming screen again on the display of the user terminal.

In one embodiment, the user may select the message button 1214 to input a message to transmit to the users participating in the group event. For example, when it is difficult to participate in the group event, the user may select the message button 1214 and enter a message indicating that the user is not able to participate due to other schedule. In this case, the message input by the user may be displayed on the screen of the ongoing video call or may be provided as an audio output.

The second operation 1220 represents that a video call is performed through the instant messaging application in response to the user selecting the response button 1218. In one embodiment, the video call screens of the users participating in the group event may be displayed on the display. For example, the video call screens of the users (e.g., "Brown", "James", "Sally", "Moon") participating in the group event "Brown's Birthday Party" may be displayed. At this time, together with the group event name (e.g., "Brown's Birthday Party)", the number of participants currently participating in the group event may be displayed on the display, so that the participation status of the users may be checked.

FIG. 13 is a diagram illustrating an example of applying a visual effect to the video call performed through the instant messaging application according to at least one example embodiment. The user may apply the visual effect to the video call through a first operation 1310 and a second operation 1320 at the user terminal. In one embodiment, when the user accepts the group event participation request and enters into the group event (e.g., video call), the user terminal may arrange the video call screens of the participants on the display based on the event host information.

The first operation 1310 represents that the video call screens of users are displayed on the display of the user terminal based on the designated event host information. For example, when the event host of the group event "Brown's Birthday Party" is designated as the birthday boy "Brown" as illustrated, the video call screen of "Brown" may be displayed in the center of the display of the user terminal, and the video call screens of other participants ("James", "Sally", "Moon", "Cony") may be displayed on the periphery of the display. Additionally or alternatively, the video call screen of "Brown" may be displayed larger than the video call screen of other participants ("James", "Sally", "Moon", "Cony"). The layout of the video call may be automatically determined according to the number of participants, the event type, and the call type. Additionally or alternatively, the layout of the video call may be determined based on the selections by the user.

In one embodiment, the visual effect and the sound effect may be applied to the group event based on the event type. For example, when the event type is "Birthday Party", a confetti effect 1312 may be automatically applied to the video call screen of the event host, and background music, sound effects, and the like related to birthday may be automatically played. On the other hand, when the event type is "business meeting", the visual effect such as a beauty filter may not be applied, and the sound effect such as background music may not be applied.

In one embodiment, a customized additional function may be provided based on the event type. As illustrated, when the event type is "Birthday Party", a gift button 1314 displaying a gift image on the video call screen of the event host, a firecracker button 1316 displaying a firecracker image on the video call screen of the event host, and a cake button 1318 displaying an image of a cake on the video call screen of the event host may be displayed on the display of the user terminal. Meanwhile, when the event type is "business meeting", a button or the like for proceeding with document sharing may be displayed on the screen.

The second operation 1320 represents that the cake is displayed as a visual effect on the video call screen of the event host in response to the user selecting the cake button 1318. In one embodiment, the information processing system may provide an interactive function (e.g., Face Play) related to the event type of "birthday party". For example, when the event host "Brown" takes an action to blow out the candles of the cake displayed on the screen, it may be displayed on the screen as the candles are blown out. In one embodiment, the information processing system may transmit the captured data/recorded data of the group event to the group event participants through the instant messaging application after the group event is ended.

FIG. 14 is a flow diagram illustrating a method 1400 for participating in a group event according to at least one example embodiment. In one embodiment, the method 1400 for participating in a group event may be performed by the user terminal (invited terminal) invited to the group event. As illustrated, the method 1400 for participating in a group event may be started at S1410, by receiving a group event invitation message from the information processing system through the instant messaging application. In this example, the invitation message may include various information for the user to determine whether or not to participate in the group event, such as the event start time, the event end time, the event name, the invited user account, the call type (e.g., voice call, video call, live broadcast, and the like), the description phrase, the event type (e.g., business meeting, birthday party, and the like), the event host, and so on. In one embodiment, the invitation message may be provided in the form of an action message on the instant messaging application, which includes a user interface for the user to input whether or not to participate in the group event.

Thereafter, at S1420, receiving a response to the invitation message from the user with a touch input or the like may be performed. In one embodiment, the user may check the contents of the invitation message displayed on the display of the user terminal and then determine whether or not to participate in the group event. For example, the user may decide to accept to participate, decline to participate, or to remain undecided. In response to the user accepting the invitation message, at S1430, transmitting, by the user terminal, an acceptance message to the information processing system through the instant messaging application may be performed. In one embodiment, the information processing system may transmit the response result from the invited terminal to the terminal of another user in real time through the instant messaging application, or may transmit it upon request from another user terminal.

At S1440, the user terminal may receive a reminder message for the group event through the instant messaging application before a time point corresponding to the event start time. In one embodiment, the user terminal may provide the reminder message received from the information processing system to the user in the chat room in the form of an action message or the like. Here, the reminder message may include the information about the event start time, the event name, and the like in order to remind the participants participating in the group event of the start time of the group event.

Thereafter, at S1450, receiving, by the user terminal, the group event participation request through the instant messaging application at a time corresponding to the event start time may be performed. The user terminal may provide a notification to the user in response to receiving the group event participation request. For example, the user terminal may display a call incoming screen on the display. Finally, at S1460, entering into the group event may be performed in response to the user accepting the group event participation request. When entering into the group event, one of the voice call, the video call, and the live broadcast may be performed according to the call type of the group event.

FIG. 15 is a flow diagram illustrating a method 1500 for generating a group event according to at least one example embodiment. In one embodiment, the method 1500 for generating a group event may be performed by the user terminal (generation terminal) that transmits the group event generation request. As illustrated, the method 1500 for generating a group event may be started at S1510, by the user terminal, by transmitting the group event generation request to the information processing system through the instant messaging application. In this example, the group event generation request may include various information related to the group event, such as an event start time, an event end time, an event name, a user account to be invited, a call type (e.g., voice call, video call, live broadcast, and the like), a description phrase, an event type (e.g., business meeting, birthday party, and the like), an event host, choice to use participation check, choice to receive a reminder (e.g., a reminder message), and so on.

Thereafter, at S1520, receiving a result of the invitation response by the user terminal may be performed. The user terminal may receive a result of the invitation responses from the invited users from the information processing system through the instant messaging application, and may provide the result of the received invitation responses to the user through the instant messaging application. In one embodiment, the information processing system may transmit the response result from the invited terminal to the generation terminal in real time through the instant messaging application, or may transmit it upon request from the generation terminal.

At S1530, the user terminal may transmit information about a modified event start time to the information processing system through the instant messaging application. In one embodiment, the user may modify the start time of the group event after checking the results of the invitation responses from the invited users through the instant messaging application. In this case, the information processing system may transmit the modified group event invitation message including the information about the modified event start time to the invited terminal through the instant messaging application.

Next, at S1540, a reminder message for the group event may be received through the instant messaging application before a time point corresponding to the event start time. In one embodiment, the user terminal may provide the reminder message received from the information processing system to the user in the chat room in the form of an action message or the like. Here, the reminder message may include the information about the event start time, the event name, and the like in order to remind the participants participating in the group event of the start time of the group event.

Thereafter, at S1550, receiving, by the user terminal, the group event participation request through the instant messaging application at a time corresponding to the event start time may be performed. The user terminal may provide a notification to the user in response to receiving the group event participation request. For example, the user terminal may display a call incoming screen on the display. Finally, at S1560, entering into the group event may be performed in response to the user accepting the group event participation request. When entering into the group event, one of the voice call, the video call, and the live broadcast may be performed according to the call type of the group event.

The method for generating the group event and the method for participating in the group event described above may be implemented as computer-readable codes on a computer-readable recording medium. The computer readable recording medium includes all kinds of recording devices in which data readable by a computer system is stored. Examples of computer readable recording medium include ROM, RAM, CD-ROM, magnetic tape, floppy disks, and optical data storage devices, and the like. In addition, the computer readable recording medium may be distributed over network coupled computer systems so that the computer readable code is stored and executed in a distributed manner. Further, programmers in the technical field pertinent to the present disclosure will be easily able to envision functional programs, codes and code segments to implement example embodiments.

The methods, operations, or techniques of this disclosure may be implemented by various means. For example, these techniques may be implemented in hardware, firmware, software, or a combination thereof. Those skilled in the art will further appreciate that the various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. A general purpose processor may be a microprocessor, but in the alternative, the processor may be any conventional processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The commands may be executable by one or more processors, and may cause the processor(s) to perform certain aspects of the functions described in the present disclosure.

When implemented in software, the techniques may be stored on a computer readable medium as one or more command or codes, or may be transmitted through a computer readable medium. The computer readable media include both the computer storage media and the communication media including any medium that facilitates the transfer of a computer program from one place to another. The storage media may also be any available media that may be accessed by a computer. By way of non-limiting example, such a computer readable medium may include RAM, ROM, EEPROM, CD-ROM or other optical disk storage, magnetic disk storage or other magnetic storage devices, or any other media that can be used to transfer or store desired program code in the form of instructions or data structures and can be accessed by a computer. Also, any connection is properly referred to as a computer readable medium.

For example, when the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer readable media.

The software module may reside in, RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although example embodiments described above have been described as utilizing aspects of the currently disclosed subject matter in one or more standalone computer systems, the present disclosure is not limited thereto, and may be implemented in conjunction with any computing environment, such as a network or distributed computing environment. Furthermore, aspects of the subject matter in this disclosure may be implemented in multiple processing chips or devices, and storage may be similarly influenced across a plurality of devices. Such devices may include PCs, network servers, and portable devices.

Although the present disclosure has been described in connection with some embodiments herein, various modifications and changes can be made without departing from the scope of the present disclosure, which can be understood by those skilled in the art to which the present disclosure pertains. In addition, such modifications and changes should be considered within the scope of the claims appended herein.

What is claimed is:

1. An operation method of a user terminal for participating in a group event through an instant messaging application, the method comprising:
    receiving, by the user terminal, a group event invitation message through the instant messaging application, the group event invitation message identifying a group event and an event start time of the group event, the group event invitation message including information about at least one user account invited to the group event;
    receiving, by the user terminal, a response to the group event invitation message from a user of the user terminal;
    displaying the information about the at least one user account on the display of the user terminal;
    displaying an invitation response result from each user who received the group event invitation message on the display;
    in response to the user accepting the group event invitation message, transmitting, by the user terminal, an acceptance message through the instant messaging application; and
    in response to the transmitting the acceptance message, receiving, by the user terminal, a group event participation request through a chatroom related to the group event of the instant messaging application at a time corresponding to the event start time identified by the group event invitation message, the group event participation request being a push notification; and
    displaying a call incoming screen of the instant messaging application on the display, wherein the receiving of the group event participation request includes receiving, by the user terminal, the group event participation request from an information processing system, the information processing system being separate from the user terminal, wherein the group event participation request is automatically transmitted by the information processing system at the time corresponding to the event start time to the user terminal and at least one of other user terminals which have sent acceptance messages through the instant messaging application, wherein a call channel is formed so that the user terminal is able to make a call through the instant messaging application in response to receiving a user input on the call incoming screen of the instant messaging application, wherein the group event invitation message further includes information about an event type, and wherein the method further comprises providing at least one of a visual effect or a sound effect to the group event, or an additional function within the group event based on the information about the event type.

2. The method according to claim 1, further comprising:
entering the group event in response to receiving, by the user terminal, an acceptance of the group event participation request from the user.

3. The method according to claim 1, further comprising:
in response to receiving, by the user terminal, a request from the user to postpone the group event participation request,
  receiving the group event participation request again, by the user terminal, through the instant messaging application after a first period of time elapses.

4. The method according to claim 1, further comprising:
registering a schedule for the group event in a calendar application based on the information about the event start time.

5. The method according to claim 1, further comprising:
receiving a reminder message for the group event through the instant messaging application a first period of time before the event start time.

6. The method according to claim 2, further comprising:
receiving at least one of captured data or recorded data of the group event through the instant messaging application.

7. The method according to claim 2,
wherein the group event invitation message further includes information about a host of the group event, and
wherein the method further comprises:
  displaying a plurality of video call screens on a display of the user terminal based on the information about the host.

8. The method according to claim 7,
wherein the displaying the plurality of video call screens on the display of the user terminal based on the information about the host comprises:
  displaying a video call screen of the host in a center of the display; and
  displaying video call screens of other participants of the group event excluding the host on a periphery of the display.

9. The method according to claim 7,
wherein the displaying the plurality of video call screens on the display of the user terminal based on the information about the host comprises:
  displaying a video call screen of the host and video call screens of other participants of the group event such that video call screen of the host is larger, on the display of the user terminal, than the video call screens of each of the other participants.

10. The method according to claim 1, further comprising:
receiving a modified group event invitation message including information about a modified event start time through the instant messaging application.

11. A non-transitory computer-readable recording medium storing computer-executable instructions that, when executed by at least one processor, cause the at least one processor to perform the method according to claim 1.

12. An operation method of a user terminal for generating a group event through an instant messaging application, the method comprising:
receiving, by the user terminal, information about an invited user account and information about an event start time of a group event from a user;
transmitting, by the user terminal, a group event generation request through the instant messaging application, the group event generation request identifying the group event and the event start time of the group event, the group event generation request including the information about the invited user account;
receiving an invitation response result of the invited user account through the instant messaging application;
displaying, on a display of the user terminal, an invitation response result of each user who received a group event invitation message based on the group event generation request; and
receiving, by the user terminal, a group event participation request through a chatroom related to the group event of the instant messaging application at a time corresponding to the event start time identified by the group event generation request, the group event participation request being a push notification; and
displaying a call incoming screen of the instant messaging application on the display, wherein the receiving of the group event participation request includes receiving, by the user terminal, the group event participation request from an information processing system, the information processing system being separate from the user terminal, wherein the group event participation request is automatically transmitted by the information processing system at the time corresponding to the event start time to the user terminal and at least one of other user terminals which have sent acceptance messages through the instant messaging application, wherein a call channel is formed so that the user terminal is able to make a call through the instant messaging application in response to receiving a user input on the call incoming screen of the instant messaging application, wherein the group event invitation message further includes information about an event type, and wherein the method further comprises providing at least one of a visual effect or a sound effect to the group event, or an additional function within the group event based on the information about the event type.

13. The method according to claim 12, further comprising:
receiving, by the user terminal, information about a modified event start time from the user; and
transmitting the information about the modified event start time through the instant messaging application.

14. The method according to claim 12, further comprising:
entering into the group event in response to receiving, at the user terminal, an acceptance of the group event participation request from the user.

15. The method according to claim 14,
wherein the group event generation request further includes information about a host of the group event, and
the method further comprises:
displaying a plurality of video call screens on the display of the user terminal based on the information about the host.

16. The method according to claim 15,
wherein the displaying the plurality of video call screens on the display of the user terminal based on the information about the host comprises:
displaying a video call screen of the host and video call screens of other participants of the group event such that video call screen of the host is larger, on the display of the user terminal, than the video call screens of each of the other participants.

17. The method according to claim 12,
wherein the group event generation request further includes information about whether to use a reminder function, and
wherein the method further comprises:
when the reminder function is enabled, receiving a reminder message for the group event through the instant messaging application a first time before the event start time.

* * * * *